United States Patent
Honma et al.

(10) Patent No.: US 7,934,874 B2
(45) Date of Patent: May 3, 2011

(54) HOLDER, FUSION-SPLICING APPARATUS, AND MANUFACTURING METHOD OF OPTICAL CONNECTOR

(75) Inventors: Toshihiko Honma, Kanagawa (JP); Tsutomu Watanabe, Kanagawa (JP); Yukihiro Yokomachi, Kanagawa (JP); Yoshikyo Tamekuni, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 291 days.

(21) Appl. No.: 11/984,089

(22) Filed: Nov. 13, 2007

(65) Prior Publication Data
US 2009/0238523 A1 Sep. 24, 2009

(30) Foreign Application Priority Data

Nov. 13, 2006 (JP) .............................. P.2006-307142

(51) Int. Cl.
*G02B 6/255* (2006.01)
(52) U.S. Cl. ................. 385/97; 385/95; 385/96; 385/98; 385/99; 385/134; 385/135; 385/136; 385/137; 385/147
(58) Field of Classification Search .............. 385/95–99, 385/134–137, 147
See application file for complete search history.

(56) References Cited

U.S. PATENT DOCUMENTS

| | | | | |
|---|---|---|---|---|
| 5,481,640 A * | 1/1996 | Harman et al. | ............... | 385/147 |
| 6,052,505 A * | 4/2000 | Bice et al. | ...................... | 385/136 |
| 6,419,810 B1 * | 7/2002 | Tanaka et al. | .................... | 205/73 |
| 6,715,933 B1 * | 4/2004 | Zimmer et al. | ................. | 385/86 |
| 7,111,990 B2 * | 9/2006 | Melton et al. | ................... | 385/53 |
| 7,113,679 B2 * | 9/2006 | Melton et al. | ................. | 385/113 |
| 7,128,478 B2 * | 10/2006 | Takahashi et al. | ............. | 385/99 |
| 7,216,512 B2 * | 5/2007 | Danley et al. | ................... | 65/392 |
| 7,264,410 B1 * | 9/2007 | Doss et al. | ...................... | 385/95 |
| 7,329,049 B2 * | 2/2008 | Meek et al. | ..................... | 385/55 |
| 7,594,764 B2 * | 9/2009 | Palmer et al. | ................... | 385/53 |
| 2005/0053342 A1 * | 3/2005 | Melton et al. | ................ | 385/113 |
| 2005/0213897 A1 * | 9/2005 | Palmer et al. | ................... | 385/95 |
| 2006/0285801 A1 * | 12/2006 | Aoki et al. | ..................... | 385/52 |

FOREIGN PATENT DOCUMENTS

| | | |
|---|---|---|
| JP | 11-023883 | 1/1999 |
| JP | 2001-013355 | 1/2001 |
| JP | 2001-059916 | 3/2001 |
| JP | 2002-82257 A | 3/2002 |

OTHER PUBLICATIONS

International Search Report, w/ English translation thereof, issued in International Application No. PCT/JP2007/072023 dated Dec. 25, 2007 claiming the priority of JP 2006-307142; and English translation of Form PCT/ISA/237.

* cited by examiner

*Primary Examiner* — Brian M. Healy
*Assistant Examiner* — Guy G Anderson
(74) *Attorney, Agent, or Firm* — McDermott Will & Emery LLP

(57) ABSTRACT

A holder capable of protecting an optical connector ferrule from an external shock, or the like and executing a fusion-splice of a short optical fiber not to take out the optical connector ferrule from the holder is obtained.

A holder for holding a connector plug equipped with an optical connector ferrule to which a short optical fiber is fitted and a plug frame for covering an outer periphery of the optical connector ferrule therein, wherein, when the short optical fiber together with the holder is fitted to a fusion splicing apparatus that fusion-splices the short optical fiber and other coated optical fiber, the short optical fiber extended from the plug frame is positioned in a fusion position.

12 Claims, 25 Drawing Sheets

HOLDER, FUSION-SPLICING APPARATUS, AND MANUFACTURING METHOD OF OPTICAL CONNECTOR

TECHNICAL FIELD

The present invention relates to a holder for housing a connector plug having an optical connector ferrule with a short optical fiber to protect it, a fusion splicing apparatus for fusion-splicing the short optical fiber and other coated optical fiber, and an optical connector assembling method of assembling an optical connector by using the holder and the fusion splicing apparatus.

RELATED ART

In the private optical wiring, etc., the optical connector must be fitted to the optical fiber cable in the field.

In the prior art, as one mode of the structure that the optical connector ferrule is connected to the end of the coated optical fiber in the field, there is an optical connector 110 set forth in Patent Literature 1 (FIG. 25).

In the optical connector 110 shown herein, a short optical fiber 103 fitted to an optical connector ferrule 102 previously are connected to a coated optical fiber 100 in the field by the fusion splice, and the circumference of a fusion spliced portion 105 is covered with a protection sleeve 101 and is reinforced.

This optical connector 110 is constructed such that a connector housing 121 houses respective elements from the optical connector ferrule 102 to a part of the coated optical fiber 100 located in the rear of the protection sleeve 101 that covers the fusion spliced portion 105 therein.

Here, the connector housing 121 is constructed to have a plug frame 122 for housing the optical connector ferrule 102 in a state that its top end is projected, a boot 123 for housing an end portion of the coated optical fiber 100, and a cylindrical stop ring 124 one end of which is fitted integrally into the plug frame 122 and the other end of which is fitted integrally into the boot 123. Also, the optical connector ferrule 102 in the plug frame 122 is energized to the top end side by a compression coil spring 125. This compression coil spring 125 enables the optical connector ferrule 102 to move back in connecting the connector such that a contact pressure between the optical connector ferrule 102 and the optical connector ferrule of the opposing optical connector can be kept within a normal range.

[Patent Literature 1] JP-A-2002-82257

The optical connector ferrule 102 used in the optical connector 110 needs delicate handling. This is because it should be prevented that the short optical fiber 103 extended from the optical connector ferrule 102 is damaged due to the bending action caused in carrying, holding, etc. the ferrule in the site.

Therefore, for the purpose of protecting the optical connector ferrule 102 and the short optical fiber 103 in carrying, holding, etc. the ferrule in the site, utilization of the housing case for housing/holding these elements may be thought of.

However, even though the housing case is employed, the optical connector ferrule 102 must be taken out from the housing case and then set to the fusion splicing apparatus prepared in the field in advance when other coated optical fiber 100 is fusion-spliced to the short optical fiber 103 in the field. As a result, it is feared that the optical connector ferrule 102 or the short optical fiber 103 is broken down during the handling needed until the optical connector ferrule 102 is set to the fusion splicing apparatus.

SUMMARY OF THE INVENTION

It is an object of the present invention to provide a holder capable of protecting an optical connector ferrule with a short optical fiber from an external shock, or the like and aligning the short optical fiber with a fusion position of a fusion splicing apparatus while holding the optical connector ferrule therein, a fusion splicing apparatus equipped with a fusion processing portion to which the holder that is holding the optical connector ferrule can be fitted and a thermal shrinkage processing portion for causing a thermal shrinkable tube that covers fusion-spliced portions of mutual optical fibers to thermally shrink, and an optical connector assembling method capable of assembling effectively an optical connector by using the holder and the fusion splicing apparatus.

The present invention solves the above problems by employing following configurations in [1] to [14].

[1] A holder for containing an optical connector ferrule to which a short optical fiber is fitted, wherein the holder is constructed to position the short optical fiber extended from the optical connector ferrule and to be fitted to a fusion splicing apparatus that fusion-splices the short optical fiber and other coated optical fiber.

[2] In the holder according to [1], a recess portion for positioning the short optical fiber extended from the optical connector ferrule is provided.

[3] In the holder according to [1], a lid member for pressing the optical connector ferrule is provided to a holder main body in which a ferrule containing portion for containing the optical connector ferrule is formed.

[4] In the holder according to [3], the lid member is formed of transparent material.

[5] In the holder according to [1], the optical connector ferrule to which the short optical fiber is fitted is contained in a mode of a connector plug whose outer periphery is covered with a plug frame.

[6] In the holder according to [5], a V groove for positioning the short optical fiber extended from the plug frame is provided.

[7] In the holder according to [5], a lid member for pressing the plug frame is provided to a holder main body on which a plug housing portion for housing the plug frame therein is formed.

[8] In the holder according to [7], the lid member is formed of a transparent material.

[9] In the holder according to [7], the lid member presses the short optical fiber positioned on the V groove.

[10] A fusion splicing apparatus for fusion-slicing a short optical fiber fitted to an optical connector ferrule and other coated optical fiber, which includes a fusion processing portion equipped with a holder fitting portion that fits the holder according to [1].

[11] In the fusion splicing apparatus according to [10], the fusion splicing apparatus further includes a thermal shrinkage processing portion for heating/shrinking a thermal shrinkable tube that is put on an outer periphery of a fusion spliced portion being formed by the fusion processing portion; wherein the thermal shrinkage processing portion is equipped with a holder fitting portion that fits the holder.

[12] In the fusion splicing apparatus according to [11], the thermal shrinkage processing portion has a first thermal shrinkage processing portion in which a heating temperature distribution is set such that a heating temperature of the thermal shrinkable tube on the short optical fiber side is higher than that on the coated optical fiber side.

[13] In the fusion splicing apparatus according to [12], the thermal shrinkage processing portion has a second thermal shrinkage processing portion in which a heating temperature distribution is set such that a heating temperature of the thermal shrinkable tube on a middle portion side is higher than that on an end portion.

[14] An optical connector assembling method of assembling an optical connector in which other coated optical fiber is fusion-spliced to a short optical fiber, by fusion-splicing the short optical fiber being fitted to an optical connector ferrule to the other coated optical fiber while using the fusion splicing apparatus according to [10], which includes a step of setting the coated optical fiber on a fiber fitting portion of a fusion processing portion of the fusion splicing apparatus; a step of setting a holder that holds a connector plug therein in a holder fitting portion of the fusion processing portion; a step of fusion-splicing the short optical fiber positioned in the holder that is fitted to the holder fitting portion and the coated optical fiber positioned in the fiber fitting portion in the fusion processing portion; a step of forming a fusion spliced portion by fusion-splicing the short optical fiber and the coated optical fiber, and then putting a protection sleeve having a thermal shrinkable tube on the fusion spliced portion; and a step of transferring the fusion spliced portion to the thermal shrinkage processing portion, and then heating the thermal shrinkable tube of the protection sleeve to shrink.

According to the holder of the present invention, when the plug frame fitted onto the optical connector ferrule to which the short optical fiber is fitted is housed in the holder, this holder can protect the optical connector ferrule and the short optical fiber from a shock, etc. applied from the outside.

In addition, this holder can position the short optical fiber being fitted into the optical connector ferrule in a fusion position of the fusion splicing apparatus while holding the plug frame therein. Therefore, the troublesome operation of taking out the connector plug from the holder in the fusion splice can be omitted, and thus the easy handling property at a time of fusion splice can be improved.

According to the fusion splicing apparatus of the present invention, the fusion processing portion equipped with the holder fitting portion to which the holder can be fitted is provided. As a result, the short optical fiber being fitted into the optical connector ferrule can be fusion-spliced to the other coated optical fiber not to pick up the optical connector ferrule from the holder, and the operability in the fusion-splicing operation can be improved.

Also, because the thermal shrinkage processing portion for causing the thermal shrinkable tube that covers the fusion-spliced portions of mutual fibers to thermally shrink is provided in parallel with the fusion processing portion, the thermally shrinking process of the thermal shrinkable tube can be applied not to take out the connector plug from the holder.

According to the optical connector assembling method of the present invention, the optical connector can be assembled effectively by using the holder and the fusion splicing apparatus without damage of the optical connector ferrule and the short optical fiber.

Figure 1:
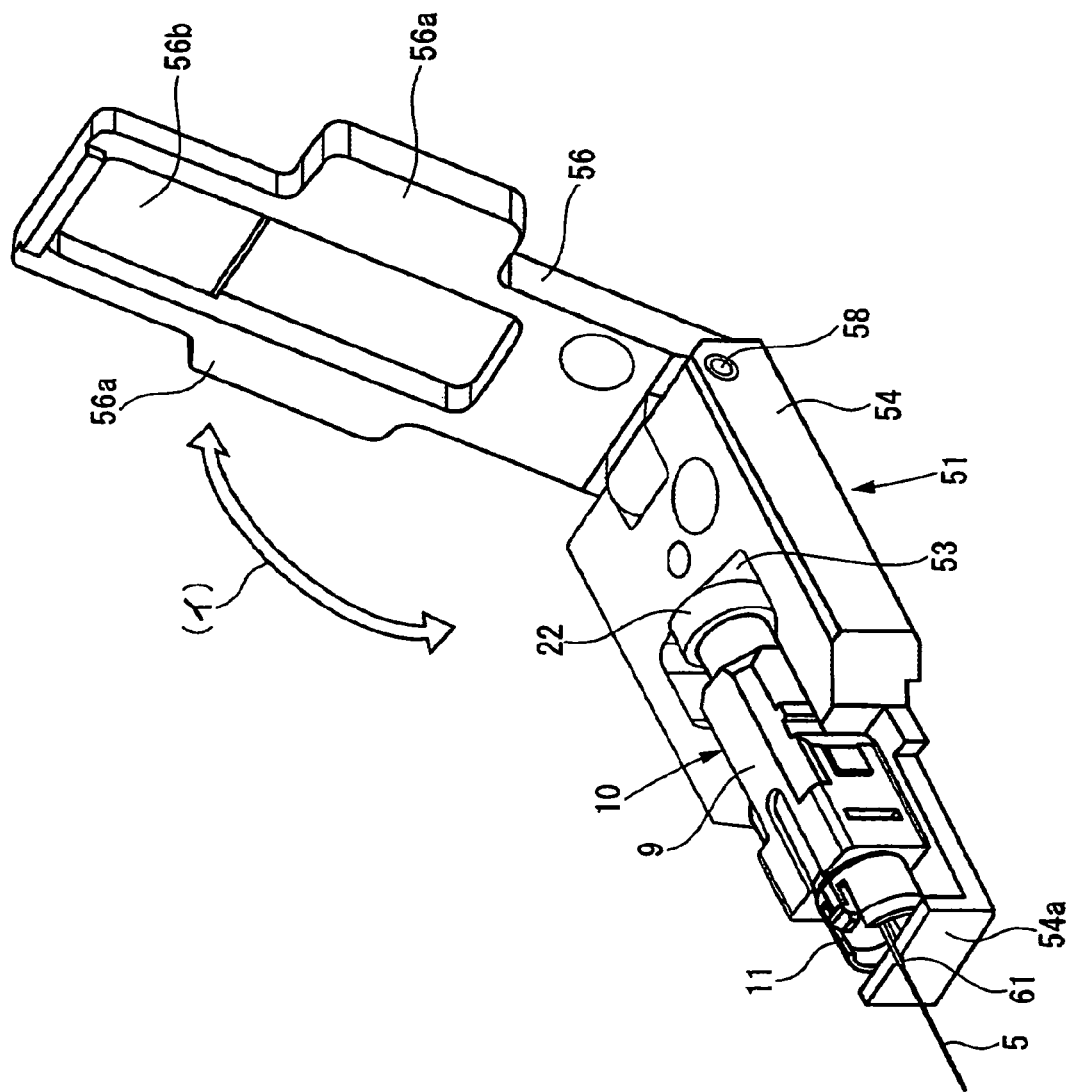
FIG. 1 A perspective view of a first embodiment of a holder according to the present invention.

DESCRIPTION OF REFERENCE NUMERALS AND SIGNS 1 optical connector
3 coated optical fiber
5 short optical fiber
7 optical connector ferrule
9 plug frame
9*a* diameter-contracted portion
9*b* engaging groove
10 connector plug 11 stopper
13 fusion spliced portion
15 protection sleeve
17 internal space
19 structural body
21 boot
22 dust cap
23 ferrule press spring
25 thermal shrinkable tube
27 core rod
29 adhesive tube
31 coupling component
33 SC connector knob
35 space
37 reinforcing tube
51 holder
53 plug housing portion
54 holder main body
56 lid member
58 rotation supporting shaft
61 V groove
63 holder
71 fusion splicing apparatus
73 holder fitting portion
74 fusion processing portion
76 thermal shrinkage processing portion
78 fiber fitting portion
79 V-groove member
81 V-groove member
83 electrode
86 first thermal shrinkage processing portion
87 second thermal shrinkage processing portion

BEST MODE FOR CARRYING OUT THE INVENTION

Respective preferred embodiments will be explained in detail in order of a holder, a fusion splicing apparatus, and an optical connector assembling method according to the present invention with reference to the drawings hereinafter.

Figure 2:
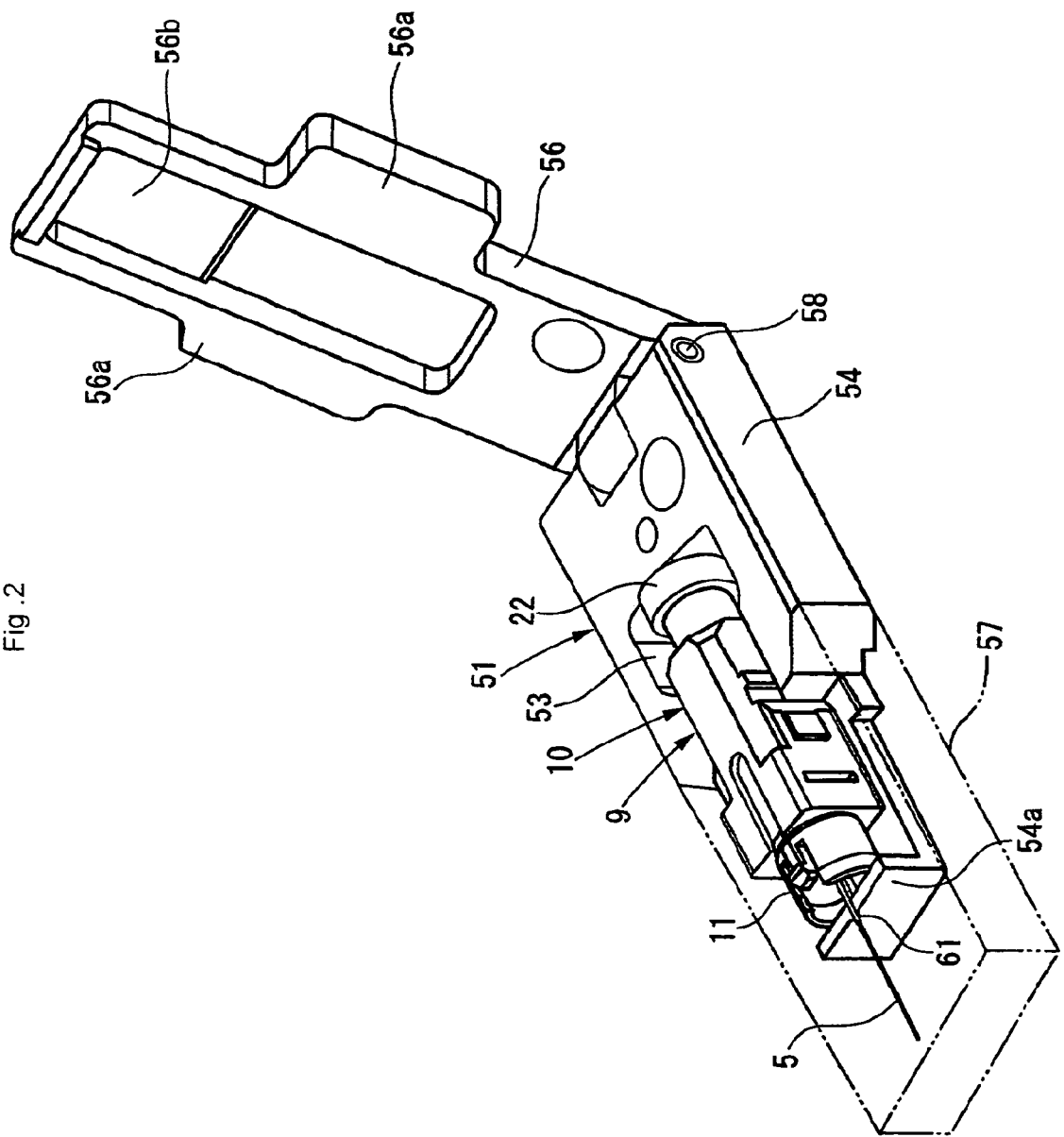
FIG. 2 A perspective view showing a state that a cap is fitted onto the holder shown in FIG. 1.
Figure 3:
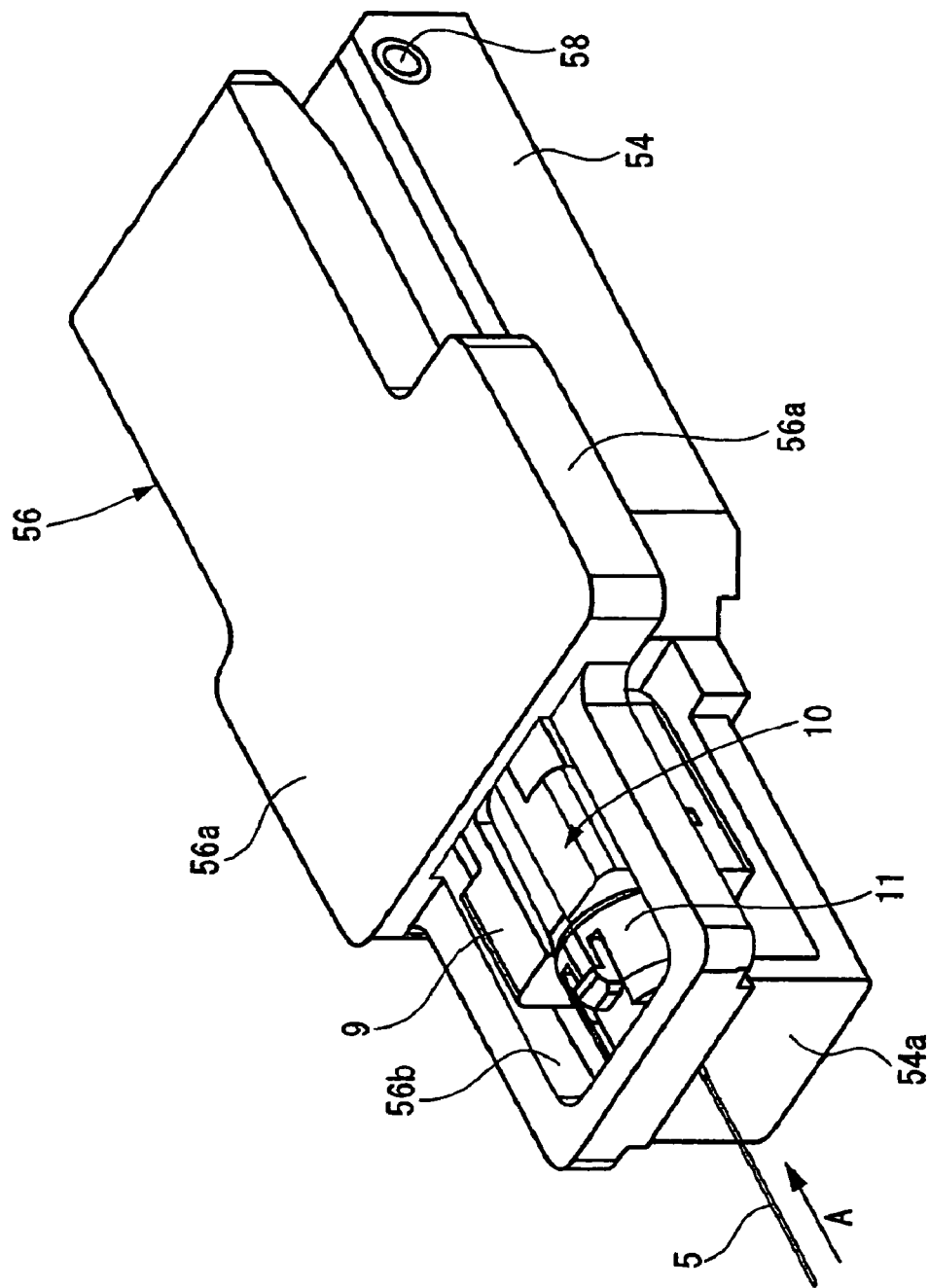
FIG. 3 A perspective view showing a state that a lid member of the holder shown in FIG. 1 is closed.
Figure 4:
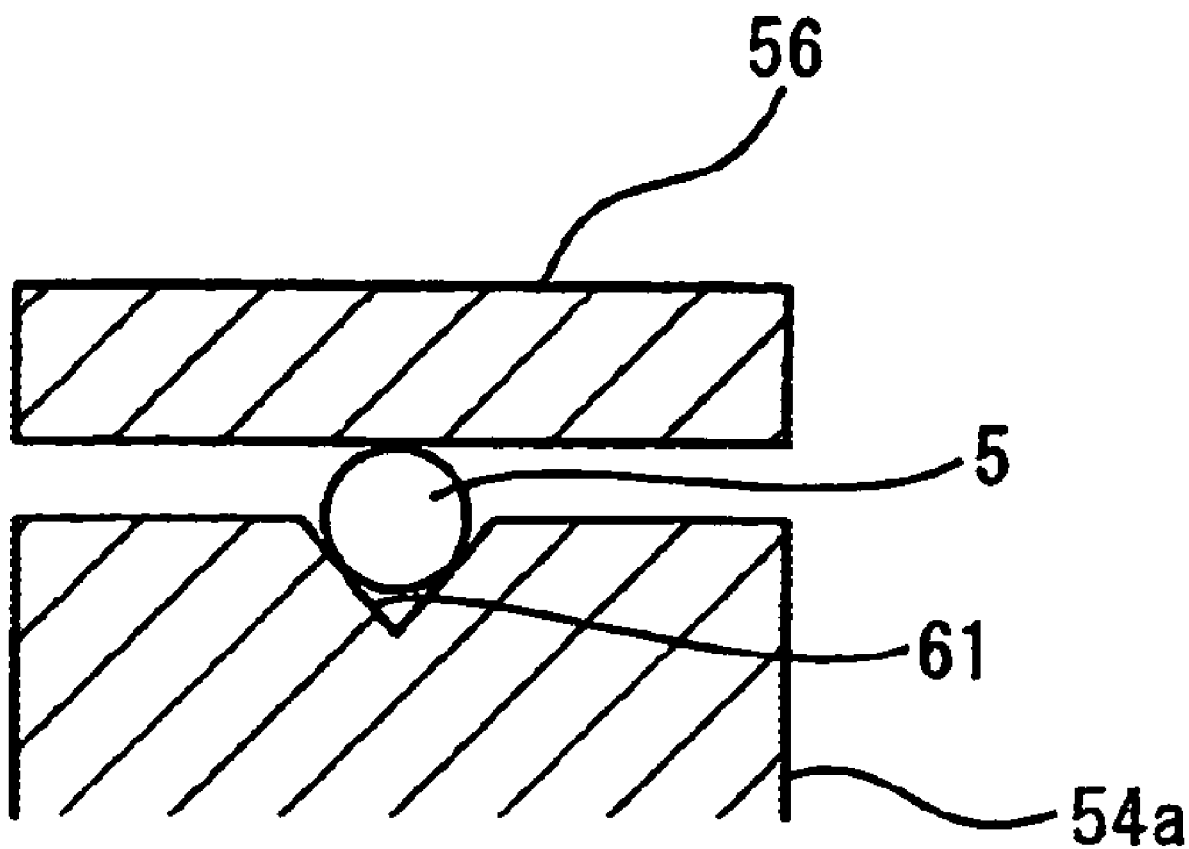
FIG. 4 A sectional-view when viewed from an arrow A in FIG. 3.

FIG. 1 is a perspective view of a first embodiment of a holder according to the present invention, wherein a lid member is opened. FIG. 2 is a perspective view showing a state that a cap is fitted onto the holder shown in FIG. 1. FIG. 3 is a perspective view showing a state that a lid member of the holder shown in FIG. 1 is closed. FIG. 4 is a schematic view when viewed from an arrow A in FIG. 3.

A holder 51 of the first embodiment holds a connector plug 10 in which a stopper 11 is fitted into a plug frame 9, into which an optical connector ferrule 7 (see FIG. 11) described later is fitted, and on which a dust cap 22 is fitted. Thus, the holder 51 protects a short optical fiber 5 fitted to the optical connector ferrule 7 previously and the connector plug 10.

In the holder 51 of the first embodiment, a foldable lid member 56 is fitted to a holder main body 54 on which a plug housing portion 53 as a recess for housing the plug frame 9 therein is formed to open upward. The foldable lid member 56 covers the plug housing portion 53 to hold the plug frame 9 contained in the plug housing portion 53.

As indicated with a chain double-dashed line in FIG. 2, a box-type cap 57 is detachably attached to the front end side of the holder main body 54 from which the short optical fiber 5 is extended. This box-type cap 57 covers the surrounding of the short optical fiber extended from the holder main body 54 to protect the short optical fiber 5 and the plug frame 9.

The cap 57 may be formed of the antistatic material.

The lid member 56 is hinged to the rear end portion of the holder main body 54 via a pivot 58 that is fitted into the rear end side of the holder main body 54. The lid member 56 when turned around the pivot 58 is opened/closed in the arrow a direction shown in FIG. 1.

The lid member 56 is shaped into an almost planar shape that covers the holder main body 54. As shown in FIG. 3, a grasping portion 56a being held by worker's fingers in opening/closing operations is provided to both sides respectively to project therefrom.

Also, as shown in FIG. 3, a window hole 56b through which the worker can view the based end portion and its periphery of the plug frame 9 housed in the holder main body 54 is formed in the lid member 56 to pass therethrough.

In the holder 51 of the first embodiment, as shown in FIG. 4, a V groove 61 is provided to an upper end surface of a front end wall 54a of the holder main body 54 through which the short optical fiber 5 passes. Thus, this V groove 61 positions and supports the short optical fiber 5 extended from the plug frame 9.

Also, as shown in FIG. 4, the lid member 56 when is closed presses the short optical fiber 5 being positioned in the V groove 61 against the front end wall 54a.

In this manner, the holder main body 54 on which the plug housing portion 53 is formed, the V groove 61 formed on the holder main body 54, and the lid member 56 for pressing the short optical fiber 5 to the V groove 61 are provided to the holder 51. Then, the holder 51 is fitted to a fusion splicing apparatus 71 that fusion-splices the short optical fiber 5 and other coated optical fiber 3 (see FIG. 8) in the field, described later. At that time, the holder 51 can position as it is the short optical fiber 5 extended from the plug frame 9, which is housed in the plug housing portion 53, in a fusion position.

According to the holder 51 of the first embodiment explained above, when the plug frame 9 fitted onto the optical connector ferrule 7, to which the short optical fiber 5 is fitted in advance, is housed in the holder 51, this holder 51 can protect the optical connector ferrule 7 and the short optical fiber 5 from a shock, etc. applied from the outside and also facilitate the handling in carrying, holding, etc. the ferrule in the site.

Also, while holding the plug frame 9 therein, the holder 51 can position the short optical fiber 5 being fitted into the optical connector ferrule 7 in a fusion position of the fusion splicing apparatus 71. Therefore, the troublesome operation of taking out the connector plug 10 from the holder 51 in the fusion splice can be omitted, and thus the easy handling property at a time of fusion splice can be improved.

In addition, if this holder 51 can be fitted to the fusion splicing apparatus that connects the existing coated optical fibers mutually, there is no need to prepare the dedicated fusion splicing apparatus.

Also, in the holder 51 of the first embodiment, the V groove 61 for positioning and supporting the short optical fiber 5 extended from the plug frame 9 is provided, and also the short optical fiber 5 extended from the optical connector ferrule 7 that is housed in this holder 51 is positioned precisely on the holder 51 by an action of the V groove 61. Therefore, when the holder 51 is set to the fusion splicing apparatus 71, no time and labor to position the short optical fiber 5 is needed.

Also, the holder 51 of the first embodiment is constructed by providing the lid member 56, on which the plug housing portion 53 for housing the plug frame 9 therein is formed to open upward, to the holder main body 54 that covers the plug housing portion 53 to press the plug frame 9 held in the plug housing portion 53. Therefore, loading/unloading of the plug frame 9 into/from the holder 51 can be executed easily by opening/closing the foldable lid member 56.

Also, in the holder 51 of the first embodiment, not only the V groove 61 for positioning/supporting the short optical fiber 5 is provided to the holder main body 54 on which the plug housing portion 53 that holds the plug frame 9 is formed to open upward, but also the lid member 56 presses the short optical fiber 5 positioned in the V groove 61.

Accordingly, the short optical fiber 5 extended from the plug frame 9 that is housed in the holder main body 54 is positioned by the V groove 61, and then is fixed to the V groove 61 by the lid member 56. Therefore, the positioning of the short optical fiber 5 can be executed without fail.

In addition, it is preferable that a projection portion should be provided to the lid member 56 on the side that is closer to the end of the short optical fiber 5 than the V groove 61 in such a way that this projection portion presses the short optical fiber 5 toward the V groove 61 from the upper side and the short optical fiber 5 is directed obliquely below. This is because, even when the short optical fiber 5 got kinked, or the like, such short optical fiber 5 is corrected along the V groove 61 and is ready to be positioned in the fusion splice.

Also, the window hole 56b through which the worker can view the based end portion and its periphery of the plug frame 9 is formed in the lid member 56. Therefore, unless the worker does not open the lid member 56, such worker can check holding condition, type, etc. of the plug frame 9 being housed.

In the first embodiment, the window hole 56b is provided in the lid member 56 to facilitate the viewing of the plug frame 9 being housed in the holder main body 54. In this case, instead of the provision of the window hole 56b, the lid member 56 may be formed of the transparent material. When the lid member 56 is formed of the transparent material in this manner, the worker can check the held plug frame 9 with his or her eyes not to open the lid member 56.

In this case, in the holder according to the present invention, the coupling position of the holder main body 54 and the lid member 56 and the opening/closing direction of the lid member 56 are not restricted to the configurative modes shown in the first embodiment.

Figure 5:
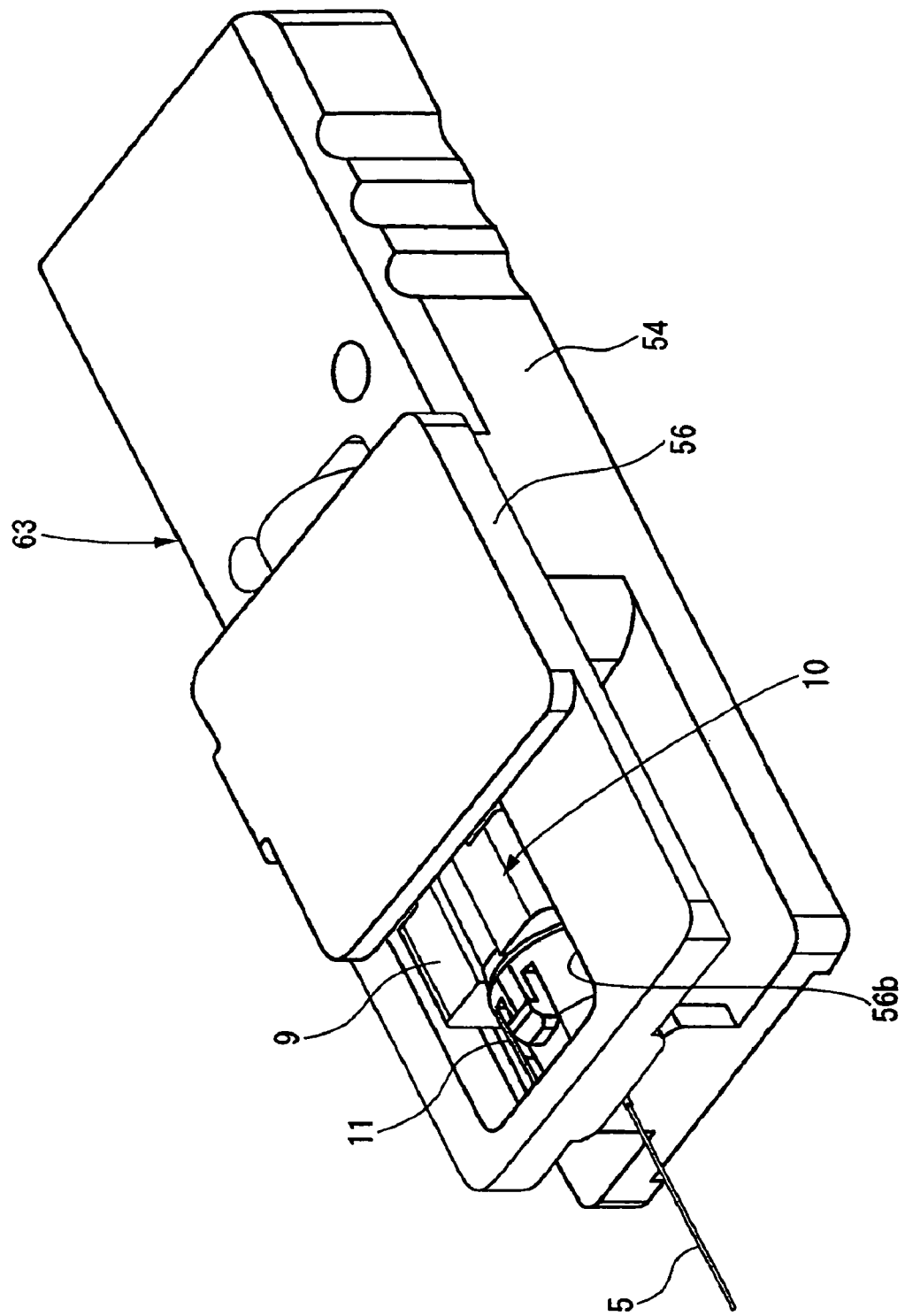
FIG. 5 A perspective view of a second embodiment of a holder according to the present invention.
Figure 6:
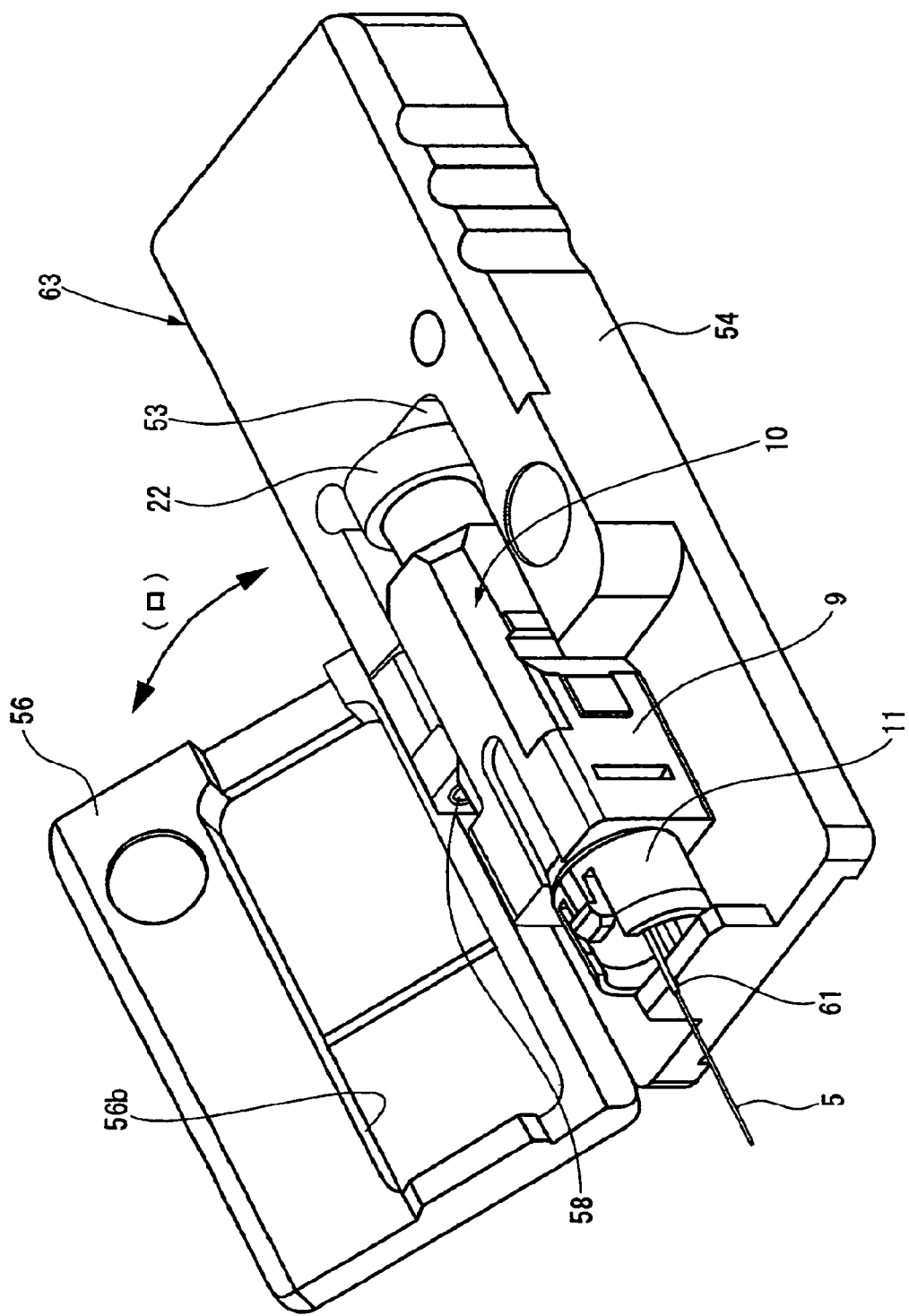
FIG. 6 A perspective view showing a state that a lid member of the holder shown in FIG. 5 is opened.

FIG. 5 is a perspective view of a second embodiment of a holder according to the present invention, wherein the foldable lid member is closed in a state that the cap is removed. FIG. 6 is a perspective view showing a state that the lid member of the holder shown in FIG. 5 is opened.

A holder 63 shown herein is common to the first embodiment in that the holder main body 54 having the plug housing portion 53, which houses therein the plug frame 9 that is fitted onto the optical connector ferrule 7 described later (see FIG. 11) while the dust cap 22 and the stopper 11 are fitted to this plug frame 9, and the lid member 56 provided foldably to the holder main body 54 to cover the plug housing portion 53 are provided.

However, in the case of this holder 63, the fitting position and the opening/closing direction of the lid member 56 are improved. In the case of this holder 63, as indicated by an arrow b in FIG. 6, the lid member 56 can be opened/closed sideward on the pivot 58 that is fitted into the side end portion of the holder main body 54.

In this manner, the fitting position and the opening/closing direction of the lid member 56 can be changed in design appropriately in response to the holder main body 54 that houses the plug frame 9.

Next, an embodiment of a fusion splicing apparatus according to the present invention will be explained hereunder.

Figure 7:
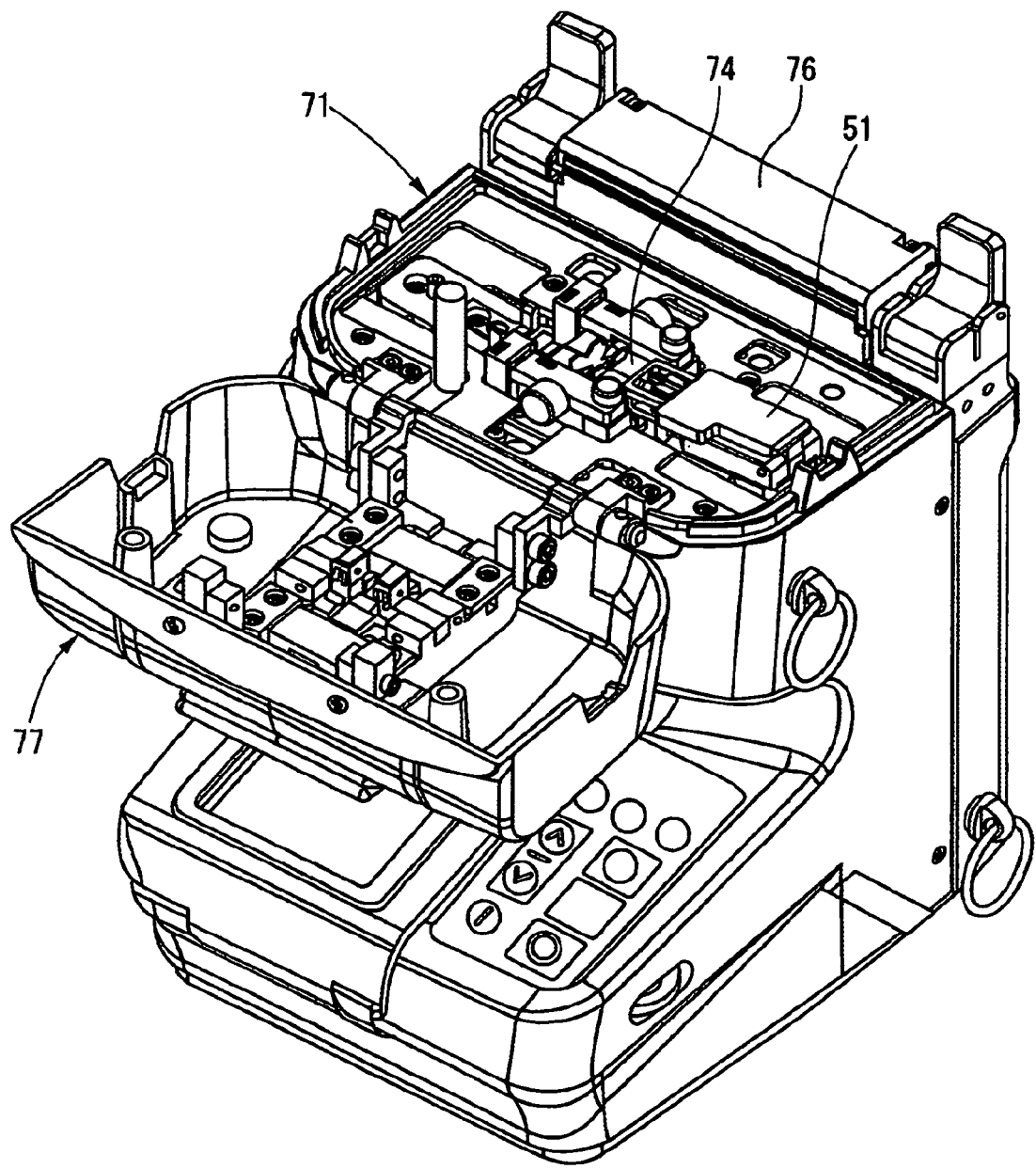
FIG. 7 A perspective view of an embodiment of a fusion splicing apparatus according to the present invention when viewed from obliquely above.
Figure 8:
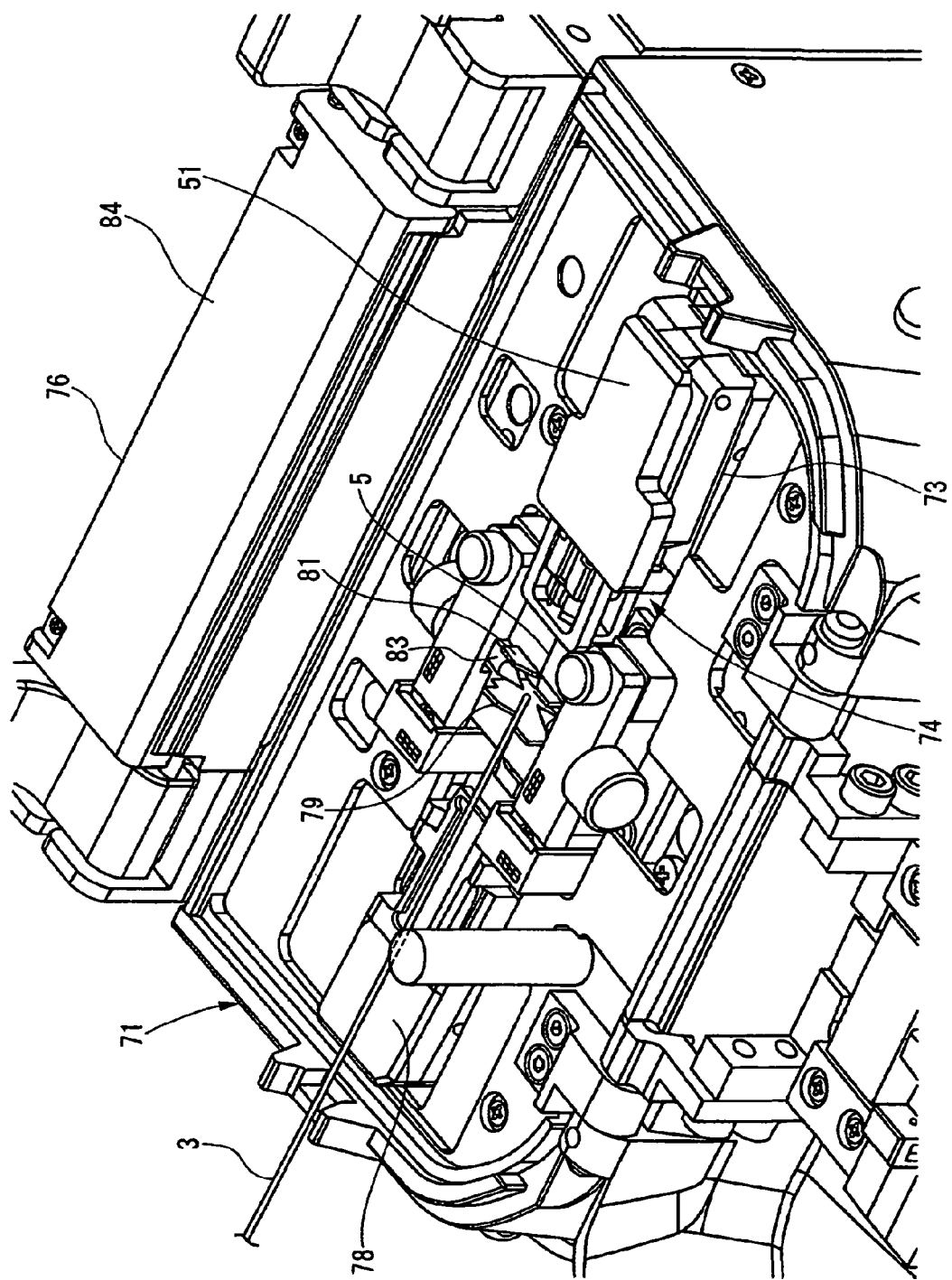
FIG. 8 An enlarged view of a fusion processing portion of the fusion splicing apparatus in FIG. 7.
Figure 9:
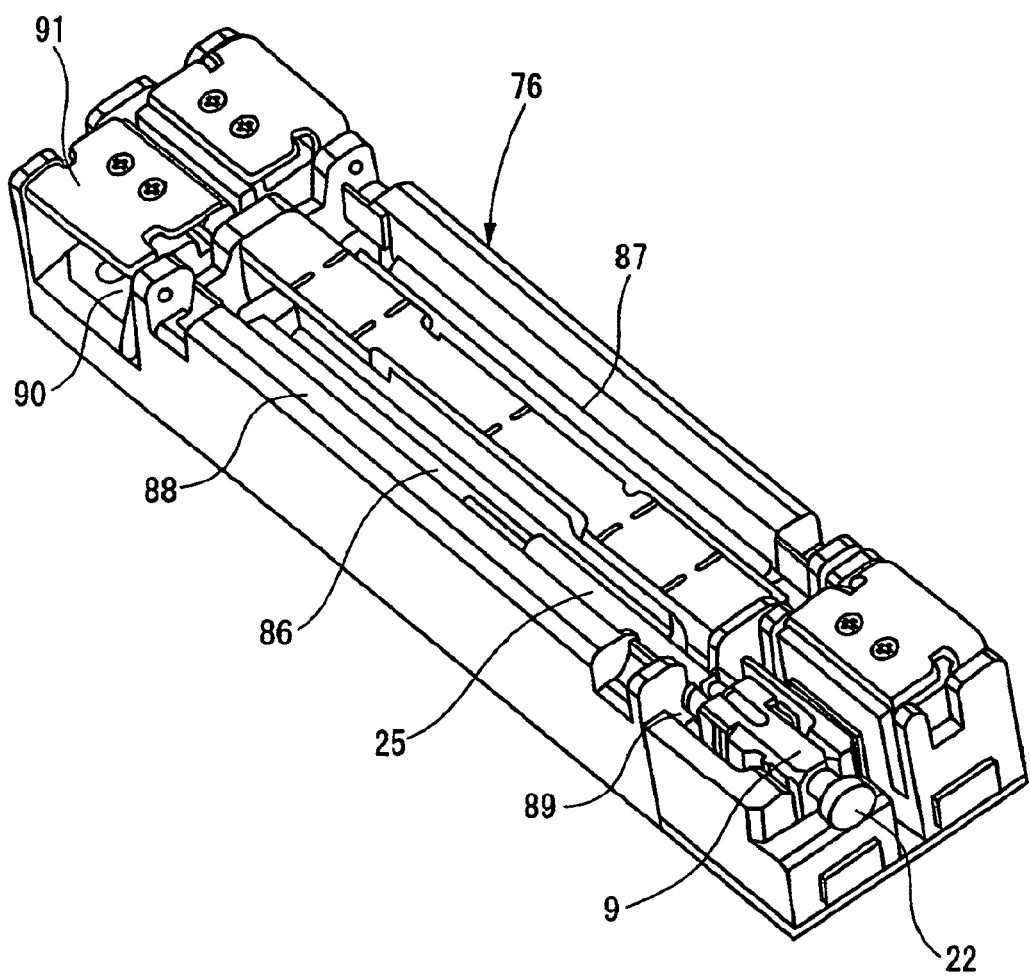
FIG. 9 An enlarged view showing a state that a cover of a thermal shrinkage processing portion of the fusion splicing apparatus in FIG. 7.

FIG. 7 is a perspective view of an embodiment of a fusion splicing apparatus according to the present invention when viewed from obliquely above. FIG. 8 is an enlarged view of a fusion processing portion of the fusion splicing apparatus in FIG. 7. FIG. 9 is an enlarged view showing a state that the cover of the thermal shrinkage processing portion provided to the fusion splicing apparatus in FIG. 7.

The fusion splicing apparatus 71 shown in FIG. 7 to FIG. 9 is such an apparatus that fusion-splices the short optical fiber 5 being fitted to the optical connector ferrule 7 to other coated optical fiber 3 in the site where the construction work to lay the optical fiber cable is carried out.

This fusion splicing apparatus 71 is equipped with a fusion processing portion 74 into which a holder fitting portion 73 fits the short optical fiber 5 housed in the holder 51 together with the holder 51 to position the fiber in a fusion position to the other coated optical fiber 3 is installed, and a thermal shrinkage processing portion 76 for thermally shrinking a thermal shrinkable tube 25 coated on an outer periphery of a fusion spliced portion 13 (see FIG. 13), which fusion-splices the short optical fiber 5 being fusion-spliced by the fusion processing portion 74 to the other coated optical fiber 3, by a heater.

The fusion processing portion 74 is provided to an upper surface portion of the apparatus that is covered with a foldable cover 77.

As shown in FIG. 8, the fusion processing portion 74 has a fiber fitting portion 78 for setting the other coated optical fiber 3 in the site, a V-groove member 79 arranged at the top end of the fiber fitting portion 78 to position a top end position of the coated optical fiber 3 being set on the fiber fitting portion 78, a V-groove member 81 for positioning a top end position of the short optical fiber 5 extended from the holder 51 being set to the holder fitting portion 73, and a pair of electrodes 83 arranged to the V-groove members 79, 81 respectively to fusion-weld mutual butted optical fibers by the electric discharge.

Dimensions of the V-groove member 81 for positioning the short optical fiber 5 and the V groove 61 of the holder 51 being set in the holder fitting portion 73 are set to support/align the short optical fiber 5 on a straight line.

The holder 51 may be fitted previously in the holder fitting portion 73. In this case, the worker picks up the connector plug 10 housed in another case and then puts this plug in the holder 51 being set in the holder fitting portion 73.

The thermal shrinkage processing portion 76 has a particular foldable cover 84, and equipped adjacently to the fusion processing portion 74.

As shown in FIG. 9, when the foldable cover 84 is opened, two thermal shrinkage processing portions of a first thermal shrinkage processing portion 86 and a second thermal shrinkage processing portion 87 provided in parallel appear.

The first and second thermal shrinkage processing portions 86, 87 have a different heating temperature distribution described later respectively, but both portions are formed in the same configuration. Therefore, only the first thermal shrinkage processing portion 86 will be explained herein.

The first thermal shrinkage processing portion 86 is equipped with a heating portion 88 to which a heater (not shown) for heating the thermal shrinkable tube 25 is provided, a holder fitting portion 89 for positioning/fitting the holder 51 that contains the connector plug 10, and a fiber-fitting portion 90.

Although omitted from the holder fitting portion 89 in FIG. 9, a foldable cover 91 for inhibiting the coming-out of the coated optical fiber and the plug frame 9 is fitted to the holder fitting portion 89 and the fiber fitting portion 90 respectively.

In the first thermal shrinkage processing portion 86, a heating temperature distribution of the heater is set such that a heating temperature of the thermal shrinkable tube 25 on the short optical fiber 5 (the connector plug 10) side is higher than that on the coated optical fiber 3 side.

In the second thermal shrinkage processing portion 87, a heating temperature distribution of the heater is set such that a heating temperature of the thermal shrinkable tube 25 on the middle portion side is higher than that on the end portion.

The first thermal shrinkage processing portion 86 is the configuration that is suitable for a protection sleeve 15 in which an end portion of the thermal shrinkable tube 25 is connected to a coupling component 31, or the like described later. The heating temperature distribution is given to the heater such that first the short optical fiber side is heated to cause the shrinkage and then the other optical fiber side is heated to cause the shrinkage. Therefore, voids generated in the thermal shrinkable tube 25 at a time of heating are ready to come out of the end portion on the other optical fiber side.

Also, if the second thermal shrinkage processing portion 87 is provided, the heating process can be applied even when the ordinary coated optical fibers are to be connected mutually. In this case, the heating temperature distribution is given to the heater such that the center portion of the thermal shrinkable tube 25 is heated at a high temperature to cause the shrinkage and then the end portion is heated to cause the shrinkage. Therefore, voids generated in the thermal shrinkable tube 25 at a time of heating are ready to come out of both end portions.

The fusion splicing apparatus 71 explained above is equipped with the fusion processing portion 74 into which the holder fitting portion 73 to which the holder 51 that housed the optical connector ferrule 7 therein can be fitted is installed. As a result, the short optical fiber 5 being fitted into the optical connector ferrule 7 can be fusion-spliced to the other coated optical fiber 3 not to pick up the optical connector ferrule 7 from the holder 51, and the operability in the fusion-splicing operation can be improved.

Also, because the thermal shrinkage processing portion 76 for causing the thermal shrinkable tube 25 that covers the fusion-spliced portions of mutual fibers to thermally shrink is provided in parallel with the fusion processing portion 74, the thermally shrinking process of the thermal shrinkable tube 25 can be applied quickly on the same fusion splicing apparatus 71. In this case, because the thermal shrinkage processing portion 76 is equipped with the holder fitting portion 89, to which the holder 51 that held the connector plug 10 therein can be fitted, similarly to the holder fitting portion 73 in the fusion processing portion 74, the thermal shrinkable tube 25 on the fusion spliced portion 13 extended from the holder 51 can be thermally shrunk at an adequate heating temperature distribution by arranging/positioning the holder 51 in the holder fitting portion 89 after the fusion process.

Also, because the second thermal shrinkage processing portion 87 having a heating temperature distribution already described is provided, one fusion splicing apparatus can be used commonly in the connection between the short optical fiber having the connector plug and the other coated optical fiber, the fusion splice between the coated optical fibers, and the heating process of the thermal shrinkable tube after both fibers are connected. Therefore, there is no necessity to prepare the dedicated fusion splicing apparatus.

In addition, in the case of the fusion splicing apparatus 71, two thermal shrinkage processing portions 76 each having a different heating temperature distribution of the heater that heats the thermal shrinkable tube 25 are provided as the thermal shrinkage processing portion 76. Therefore, the heating process to meet the fitting mode of the thermal shrinkable tube 25 can be carried out by selecting either of the thermal shrinkage processing portions 76.

In respective embodiments of the holder, such a configuration is shown that the lid member is fitted to the holder main body. However, the foldable cover of the fusion splicing apparatus can be used commonly as this lid member.

Next, an optical connector assembling method according to the present invention will be explained with reference to FIG. 10 to FIG. 14 and FIG. 16 hereunder.

Figure 10:
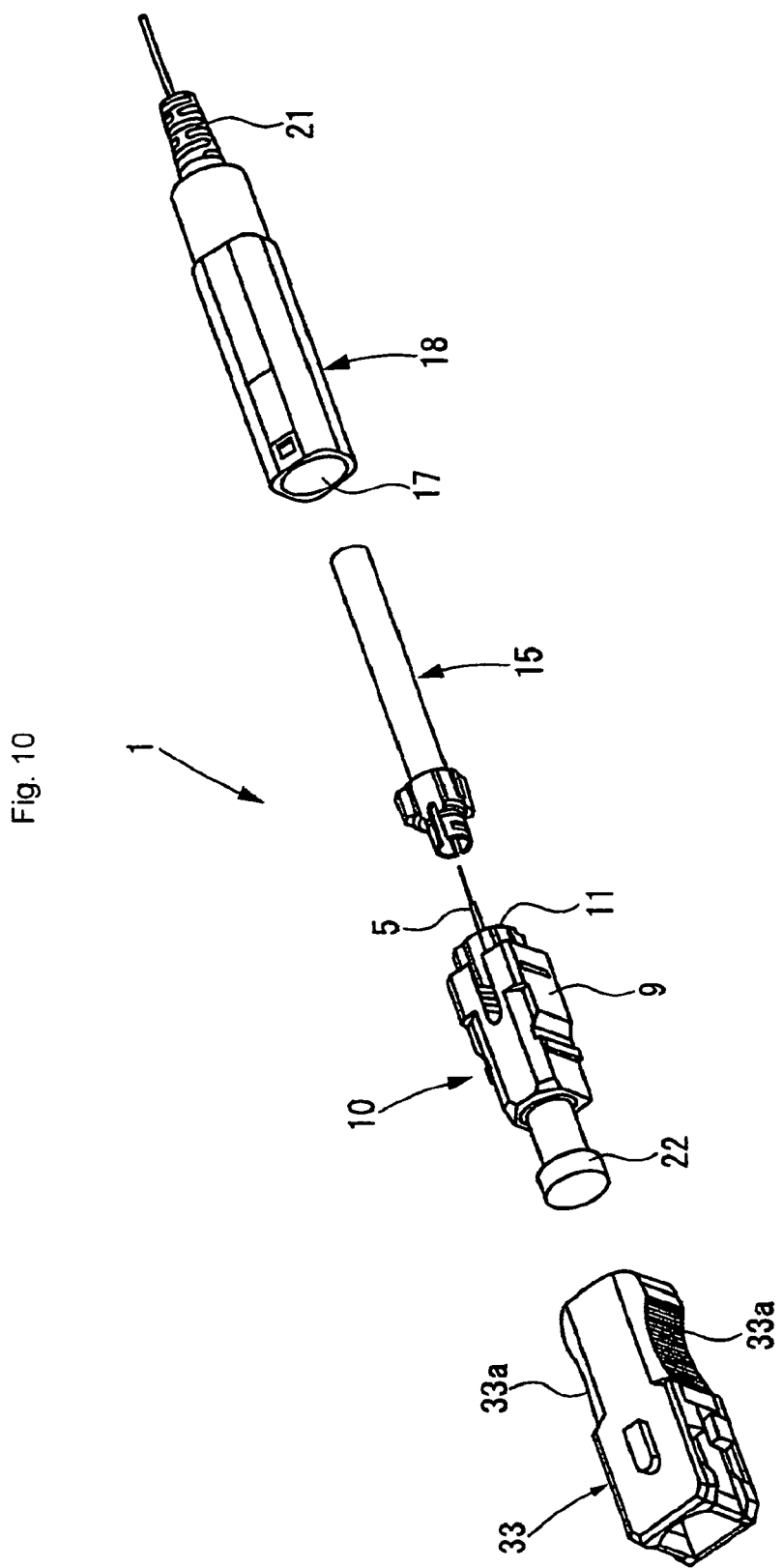
FIG. 10 A perspective exploded view showing a schematic configuration of an optical connector that is assembled by using the fusion splicing apparatus in FIG. 7.
Figure 11:
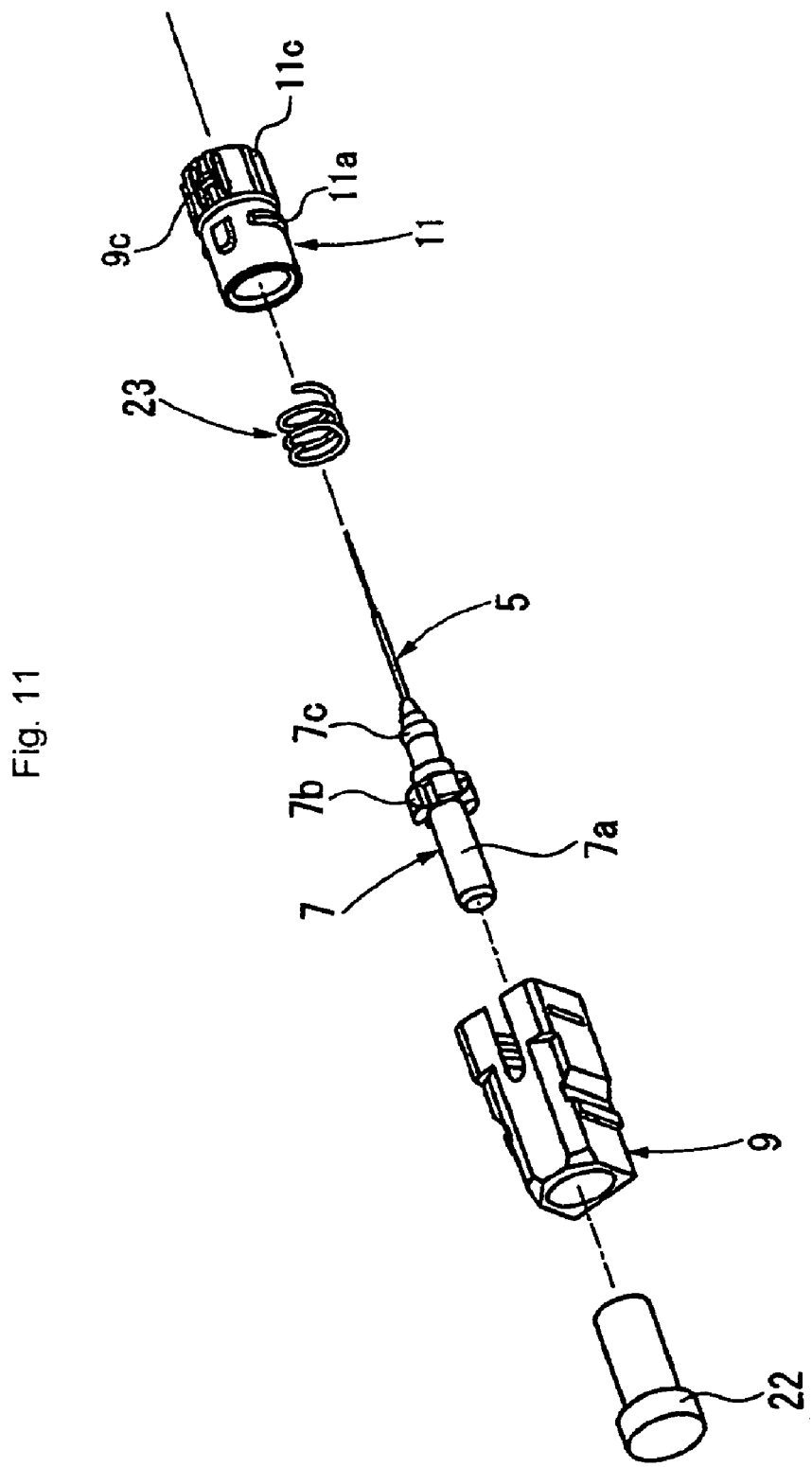
FIG. 11 A perspective exploded view of a connector plug shown in FIG. 10.
Figure 12:
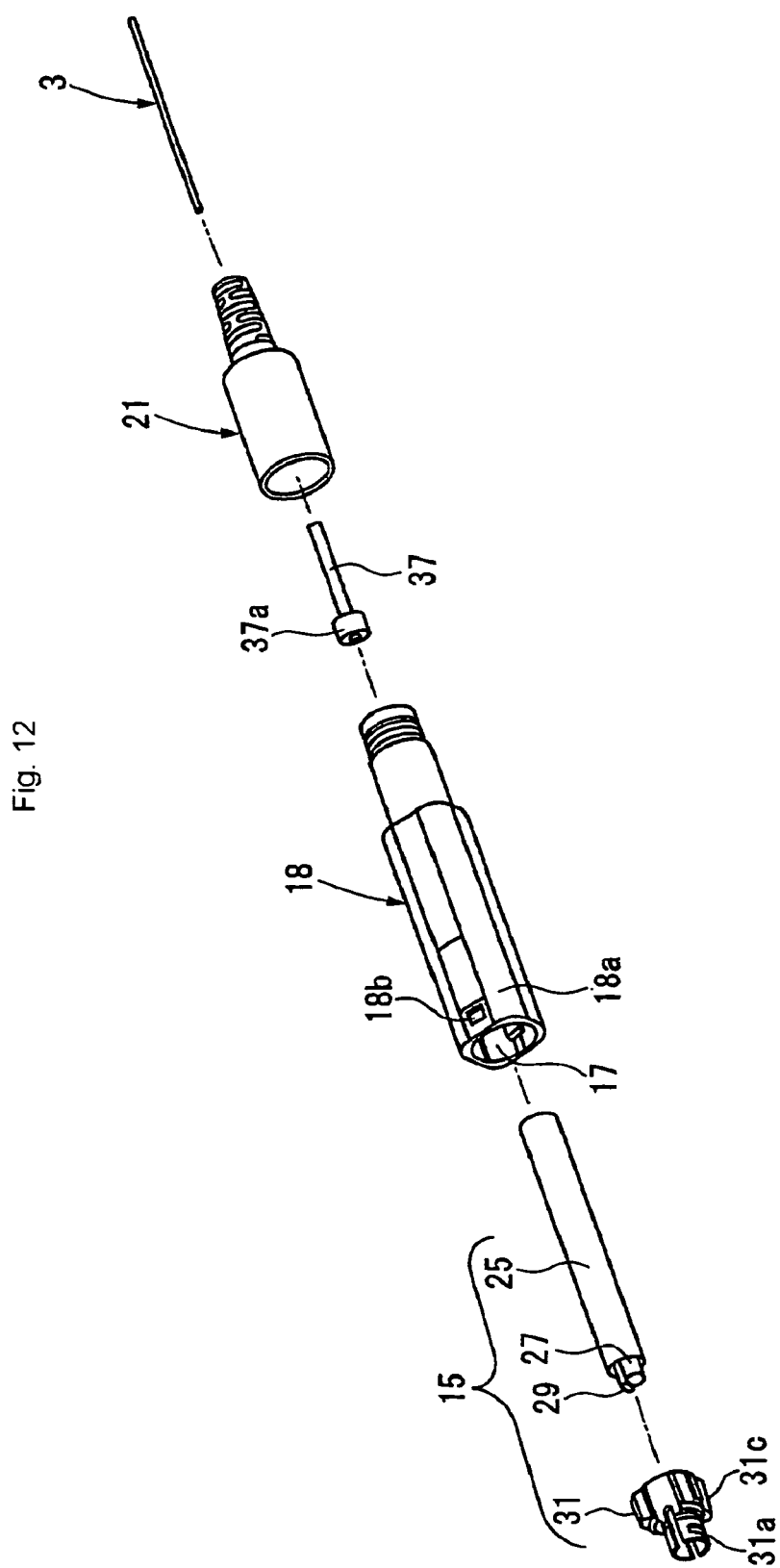
FIG. 12 A perspective exploded view of a protection sleeve and a rear housing shown in FIG. 10.
Figure 13:
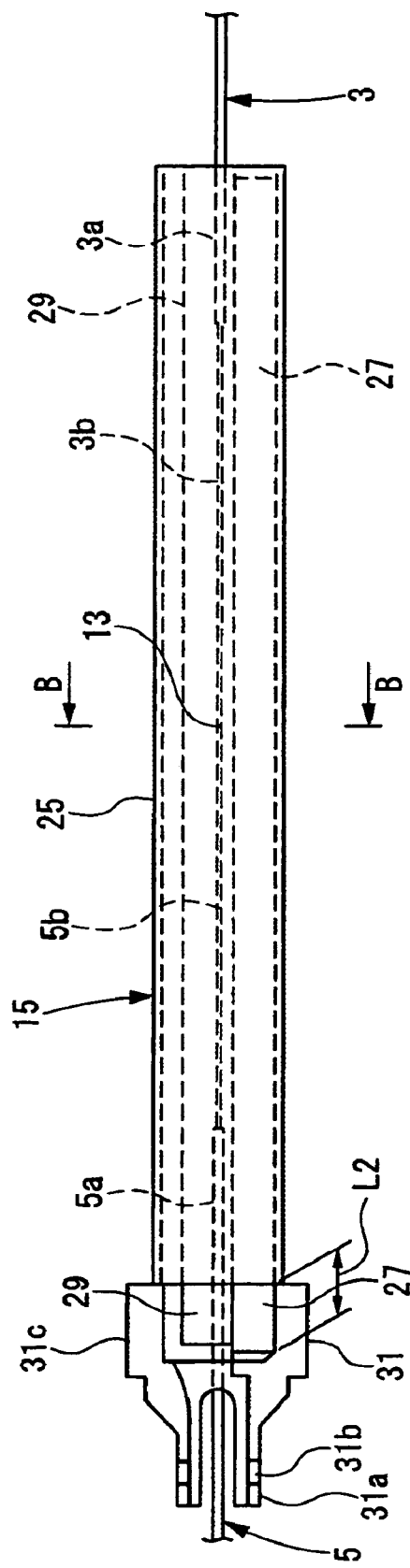
FIG. 13 An enlarged side view of the protection sleeve shown in FIG. 12.
Figure 14:
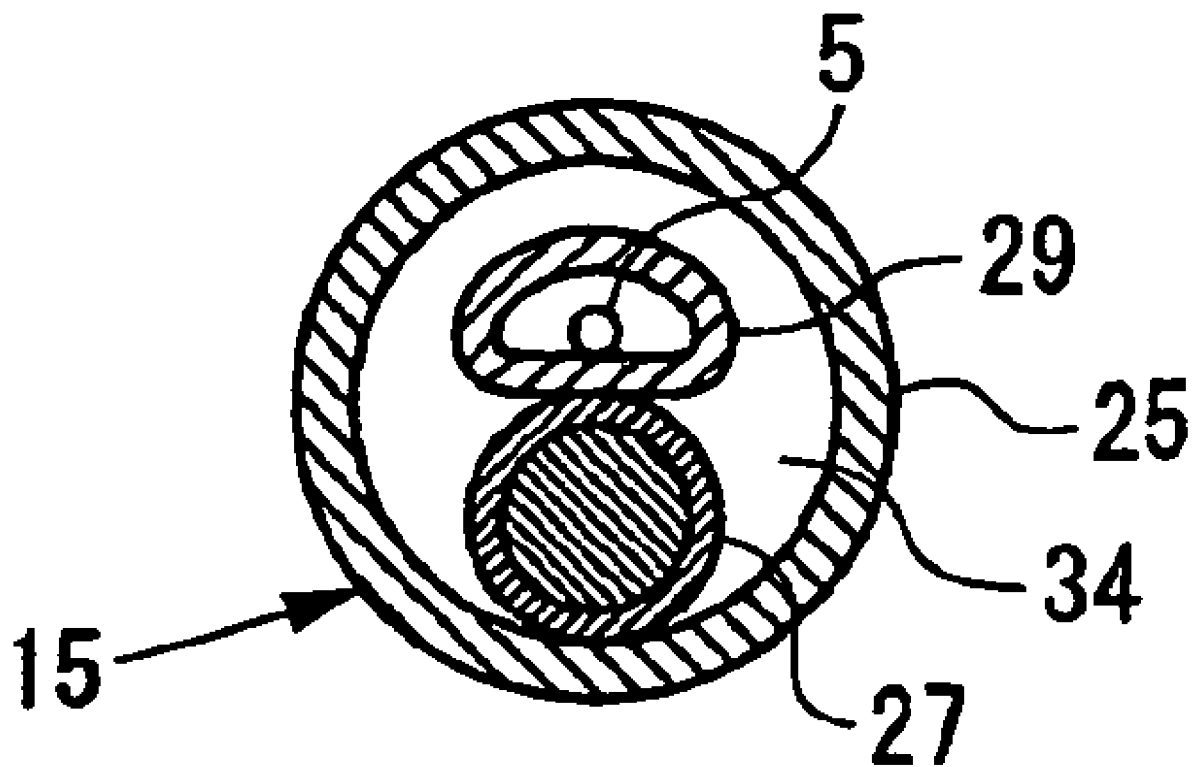
FIG. 14 A sectional view taken along a B-B line in FIG. 13.
Figure 15:
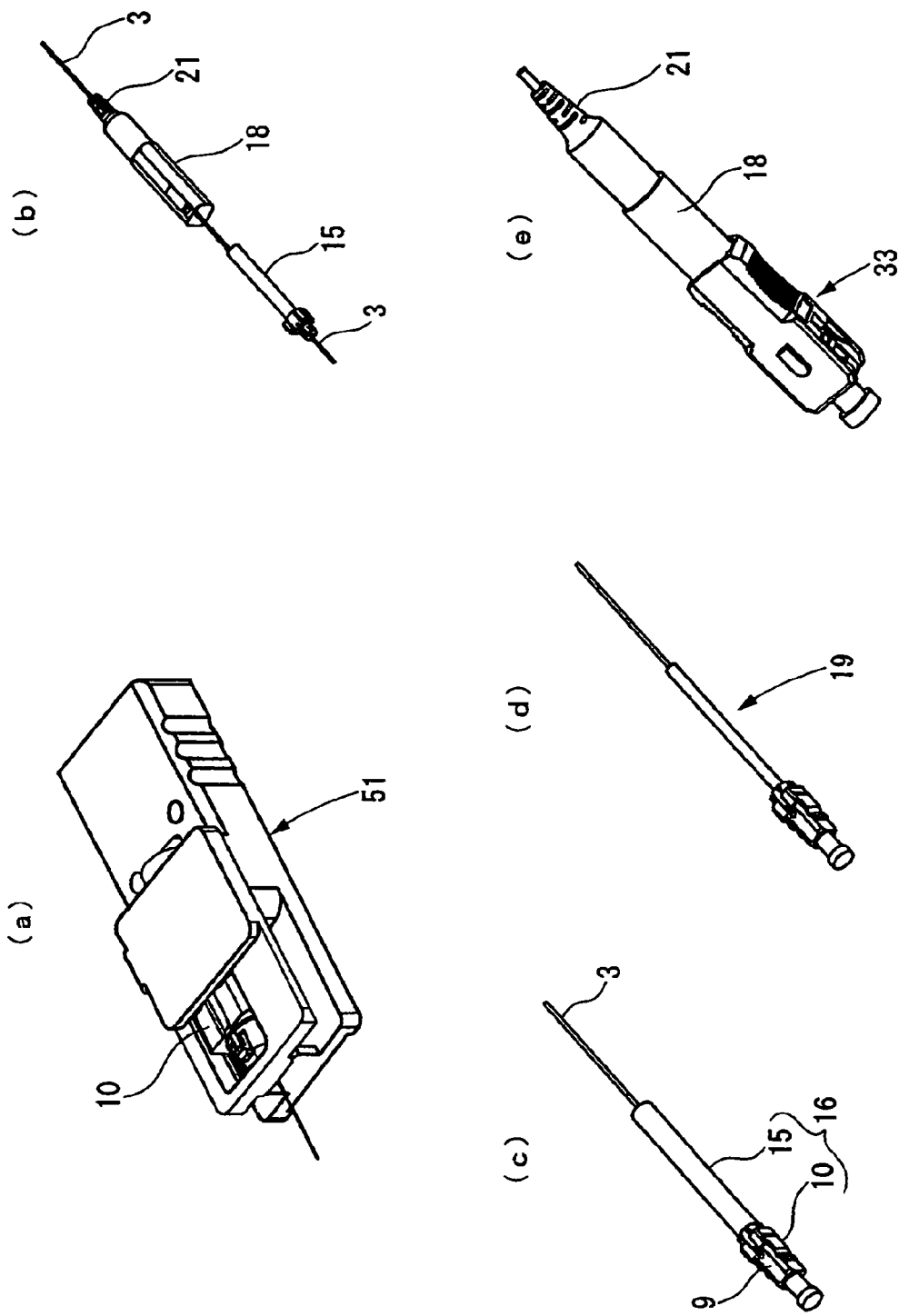
FIG. 15 An explanatory view of procedures of an optical connector assembling method according to the present invention.
Figure 16:
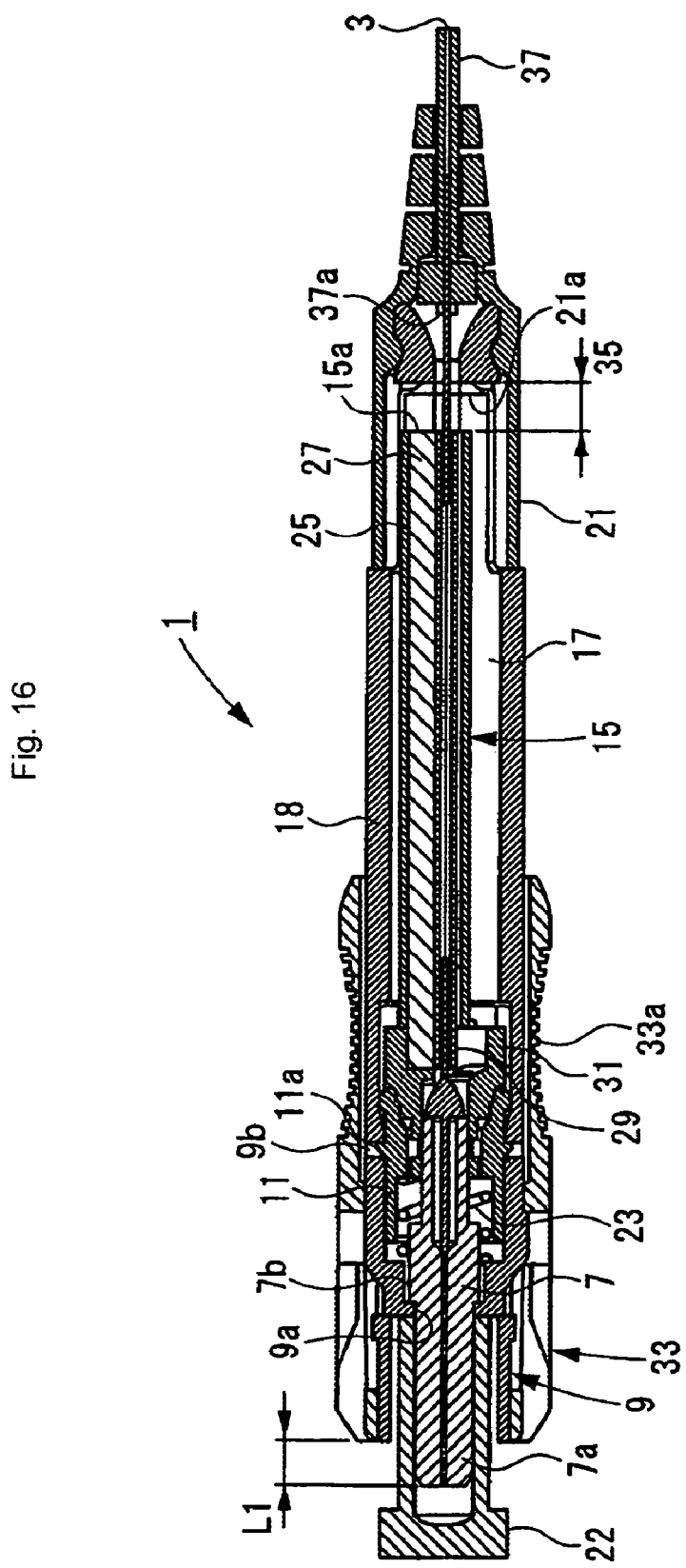
FIG. 16 A longitudinal sectional view of the optical connector that is completed by the optical connector assembling method in FIG. 15.

FIG. 10 is a perspective exploded view showing a schematic configuration of the optical connector that is assembled by using the fusion splicing apparatus in FIG. 7. FIG. 11 is a perspective exploded view of a connector plug shown in FIG. 10. FIG. 12 is a perspective exploded view of a protection sleeve and a rear housing shown in FIG. 10. FIG. 13 is an enlarged side view of the protection sleeve shown in FIG. 12. FIG. 14 is a sectional view taken along a B-B line in FIG. 13. FIG. 15 is an explanatory view showing procedures of the optical connector assembling method according to the present invention. FIG. 16 is a longitudinal sectional view of the optical connector that is completed by the optical connector assembling method in FIG. 15.

An optical connector 1 is fitted to the end portion of the coated optical fiber 3 in the field. As shown in FIG. 10, the optical connector 1 includes the connector plug 10 in which the optical connector ferrule 7 is fitted into the plug frame 9, an SC connector knob 33 fitted onto the outer periphery of the connector plug 10, the protection sleeve 15 for covering the circumference of the fusion spliced portion 13 (see FIG. 13) between the short optical fiber 5 fitted to the optical connector ferrule 7 and the coated optical fiber 3 in the field, a rear housing 18 which has an internal space 17 in which the protection sleeve 15 is arranged and whose top end is coupled integrally to the plug frame 9, and a boot 21 which houses the end portion and its neighborhood of the coated optical fiber 3 being fusion-spliced to the short optical fiber 5 therein to protect the coated optical fiber 3 and whose top end is coupled integrally to the base end of the rear housing 18.

As shown in FIG. 11, the connector plug 10 has the optical connector ferrule 7 to which the short optical fiber 5 is fitted in advance, the plug frame 9 that houses/holds the optical connector ferrule 7, the almost cylindrical stopper 11 which is fitted into the opening of the plug frame 9 on the base end side and into which the optical connector ferrule 7 is inserted, a ferrule press spring 23 fitted between the stopper 11 and a diameter-enlarged portion 7b of the optical connector ferrule 7 in its compressed mode to support elastically the optical connector ferrule 7 in the plug frame 9 to retreat, and the dust cap 22 fitted to the top end side of the plug frame 9 to cover a top end shaft portion 7a of the optical connector ferrule 7 projected from the top end of the plug frame 9.

The connector plug 10 is contained/held in the above holders 51, 63.

The optical connector ferrule 7 has such a shape that the diameter-enlarged portion 7b whose diameter is enlarged is provided at the back of the top end shaft portion 7a that is butt-connected to the opposing optical connector ferrule. The short optical fiber 5 is fitted such that its center axis agrees with the top end shaft portion 7a. Also, as shown in FIG. 11, a sleeve coupling projection 7c to which the protection sleeve 15 is coupled is provided on the outer periphery of the optical connector ferrule 7 on the base end side from which the short optical fiber 5 is protruded.

When the optical connector ferrule 7 is inserted into opening on the basal end side of the plug frame 9, the front end of the diameter-enlarged portion 7b contacts a diameter-contracted portion 9a projected from the inner periphery of the plug frame 9 to restrict its forward movement, as shown in FIG. 16. In this condition, as shown in FIG. 16, a position of the optical connector ferrule 7 is restricted such that the top end of the optical connector ferrule 7 is protruded from the top end of the plug frame 9 by a predetermined length L1.

Then, as described above, in order to prevent that a dust, and the like adhere to the fiber end surface in keeping the optical fiber, and the like, the dust cap 22 is put on the top end of the optical connector ferrule 7 that is positioned in the plug frame 9.

As shown in FIG. 13, the fusion spliced portion 13 is formed by causing an uncoated portion 5b from which a coating 5a in the end portion of the short optical fiber 5 is peeled off and an uncoated portion 3b from which a coating 3a in the end portion of the coated optical fiber 3 is peeled off to butt to each other, and then fusion-splicing the butted fiber end surfaces mutually.

As shown in FIG. 12 to FIG. 14, the protection sleeve 15 has the thermal shrinkable tube 25, a core rod 27 passed through the thermal shrinkable tube 25 and an adhesive tube 29, and the coupling component 31 secured to one end of the thermal shrinkable tube 25. The coupling component 31 is coupled to the optical connector ferrule 7.

The thermal shrinkable tube 25, when heated up to a predetermined temperature by the heater, causes the thermal shrinkage and is tightly adhered to the core rod 27 passing therethrough.

As shown in FIG. 13 and FIG. 14, the core rod 27 is a solid round rod whose cross sectional shape is a circle, and is passed through the thermal shrinkable tube 25 as a reinforcing core material. As the core rod 27, a steel wire, a glass, and the like can be employed.

The adhesive tube 29 is the tube that is made of an adhesive agent and is inserted into the thermal shrinkable tube 25 along with the core rod 27 longitudinally. The adhesive tube 29 is softened by the heating being applied in thermally shrinking the thermal shrinkable tube 25, and acts as an adhesive to fill a clearance 34 between the thermal shrinkable tube 25 and the core rod 27 shown in FIG. 14.

The protection sleeve 15 positions at first the thermal shrinkable tube 25, the core rod 27, and the adhesive tube 29 in a state that the end portion of the core rod 27 and the end portion of the adhesive tube 29 protrude from one end of the thermal shrinkable tube 25 by a predetermined length L2, shown in FIG. 13. The base end of the coupling component 31 is secured to one end of the thermal shrinkable tube 25 in this positioning state.

When end portions of the thermal shrinkable tube 25 and the core rod 27 are press-fitted, adhered, or deposited to the coupling component 31, this coupling component 31 is fixed integrally to the thermal shrinkable tube 25 and the core rod 27.

As shown in FIG. 13, in the coupling component 31, an end portion on the optical connector ferrule 7 side is shaped into a cylinder portion 31a that is fitted onto the base end of the optical connector ferrule 7. An engaging hole 31b with which the sleeve coupling projection 7c of the optical connector ferrule 7 is engaged is formed in this cylinder portion 31a.

One end of the protection sleeve 15 is coupled integrally with the optical connector ferrule 7 by engaging the sleeve coupling projection 7c with the engaging hole 31b.

When the optical connector 1 is assembled, the coated optical fiber 3 is passed previously through the protection sleeve 15 as well as the rear housing 18 and the boot 21, as shown in FIG. 15(b), and the protection sleeve 15 is replaced on the coated optical fiber 3 after the coated optical fiber 3 and the short optical fiber 5 are fusion-spliced. Then, length dimensions of the short optical fiber 5 and the protection sleeve 15 are set with respect to the thermal shrinkable tube 25, the core rod 27, and the adhesive tube 29 such that the fusion spliced portion 13 is positioned just in an almost middle position of the protection sleeve 15 in the longitudinal direction when the coupling component 31 is coupled to the base end of the optical connector ferrule 7.

In more precisely speaking, the protection sleeve 15 is moved onto the fusion spliced portion 13 to cover the fusion spliced portion 13 after the short optical fiber 5 and the coated optical fiber 3 are fusion-spliced, then the coupling component 31 of the protection sleeve 15 is coupled to the optical connector ferrule 7, and then the coated optical fiber 3 and the short optical fiber 5 around the fusion spliced portion 13 are secured along the core rod 27 longitudinally by heating the thermal shrinkable tube 25.

In the case of the present embodiment, diameter dimensions of the coupling component 31, the core rod 27, and the like are set such that fiber positions of the short optical fiber 5 and the coated optical fiber 3 being arranged in the protection sleeve 15 agree with an axis center of the optical connector ferrule 7 in a state that the thermal shrinkable tube 25 has been thermally shrunk.

The rear housing 18 is a cylindrical structural body for covering the circumference of the protection sleeve 15, and is formed by the resin injection molding, or the like. A top end of the rear housing 18 is shaped into a cylinder portion 18a that is fitted onto the base end of the plug frame 9. Then, an engaging hole 18b that engages with an engaging claw (not shown) formed on the outer periphery of the based end of the plug frame 9 to project when this cylinder portion 18a is fitted onto the base end of the plug frame 9 is provided to this cylinder portion 18a.

The above rear housing 18 is put on the protection sleeve 15 after the thermal shrinking process of the protection sleeve 15. Then, the rear housing 18 is coupled integrally to the plug frame 9 when the engaging hole 18b on the top end side is engaged with the engaging claw of the plug frame 9.

In the case of the present embodiment, the SC connector knob 33 serving as a knob portion in the connector connection is put/fitted on the outer periphery of the plug frame 9 to which the rear housing 18 is coupled. This SC connector knob 33 is the enclosure member that provides an external appearance of the optical connector 1 on the top end side. A non-slip serrated portion 33a for easy grasping is formed on the outer surface of the SC connector knob 33.

The boot 21 protects the coated optical fiber 3 such that a sharp bending is not applied to the coated optical fiber 3 that extended to the rear side of the rear housing 18. The boot 21 is coupled integrally with the rear housing 18 when its top end is tightly fitted to or screwed into the base end of the rear housing 18.

Alternatively, the boot may be formed integrally with the rear housing 18 by injection molding of a resin.

In the case of the present embodiment, as shown in FIG. 16, a space 35 for enabling the protection sleeve 15 to retreat is created between other end 15a of the protection sleeve 15 and an inner wall end 21a of the boot 21 opposing to this other end 15a.

Further, as shown in FIG. 12 and FIG. 16, a reinforcing tube 37 that is put on the coated optical fiber 3 is inserted/ fitted to the back of the inner wall end 21a of the boot 21.

A disconnection-preventing portion 37a whose diameter is enlarged is provided to the top end of the reinforcing tube 37. A backward movement of the boot 21 is restricted when the disconnection-preventing portion 37a is latched. The reinforcing tube 37 is a tube that has an adequate elasticity and prevents that the coated optical fiber 3 is bent sharply.

Next, a method of assembling the optical connector 1 shown in FIG. 16 by using the holder 51 and the fusion splicing apparatus 71 explained above will be explained hereunder.

In this assembling method, as shown in FIG. 15(a), the holder 51 in which the connector plug 10 is housed is prepared previously. Also, as shown in FIG. 15 (b), the coated optical fiber 3 in the field is passed through the protection sleeve 15, the rear housing 18, and the boot 21.

Then, as shown in FIG. 8, a step of setting the coated optical fiber 3 on the fiber fitting portion 78 of the fusion processing portion 74 in the fusion splicing apparatus 71 and a step of setting the short optical fiber 5 in which the connector plug 10 is housed on the holder fitting portion 73 of the fusion processing portion 74 are executed.

Then, the short optical fiber 5 positioned in the holder 51 being fitted to the holder fitting portion 73 and the coated optical fiber 3 positioned on the fiber fitting portion 78 are fusion-spliced to each other in the fusion processing portion 74.

Then, the fusion spliced portion 13 is formed by fusion-splicing the short optical fiber 5 and the coated optical fiber 3, and then the connector plug 10 is taken out from the holder 51. Then, as shown in FIG. 15(c), the protection sleeve 15 having the thermal shrinkable tube 25 is put on the fusion spliced portion 13, and the coupling component 31 formed on one end of the protection sleeve 15 is coupled to the plug frame 9. Thus, a step of obtaining a sleeve-plug coupled body 16 in which one end of the protection sleeve 15 is coupled to the plug frame 9 is carried out.

Also, the sleeve-plug coupled body 16 is transferred to the first thermal shrinkage processing portion 86 of the thermal shrinkage processing portion 76, and the thermal shrinkable tube 25 of the protection sleeve 15 is thermally shrunk. Thus, a step of obtaining a structural body 19 in which the fusion spliced portion 13 is reinforced by the thermal shrinkable tube 25 being shrunk, as shown in FIG. 15(d), is carried out.

Then, the rear housing 18 and the boot 21 through which the coated optical fiber 3 is passed previously are coupled to the plug frame 9 of the structural body 19. Thus, a completed structure shown in FIG. 15(e) can be obtained.

According to the above optical connector assembling method, the optical connector 1 can be assembled effectively by using the holder 51 and the fusion splicing apparatus 71 without damage of the optical connector ferrule 7 and the short optical fiber 5.

Next, a third embodiment of the holder and the fusion splicing apparatus according to the present invention will be explained hereunder.

First, prior to explanation of the holder and the fusion splicing apparatus, the optical connector used in the holder of the present embodiment will be explained hereunder.

Figure 17:
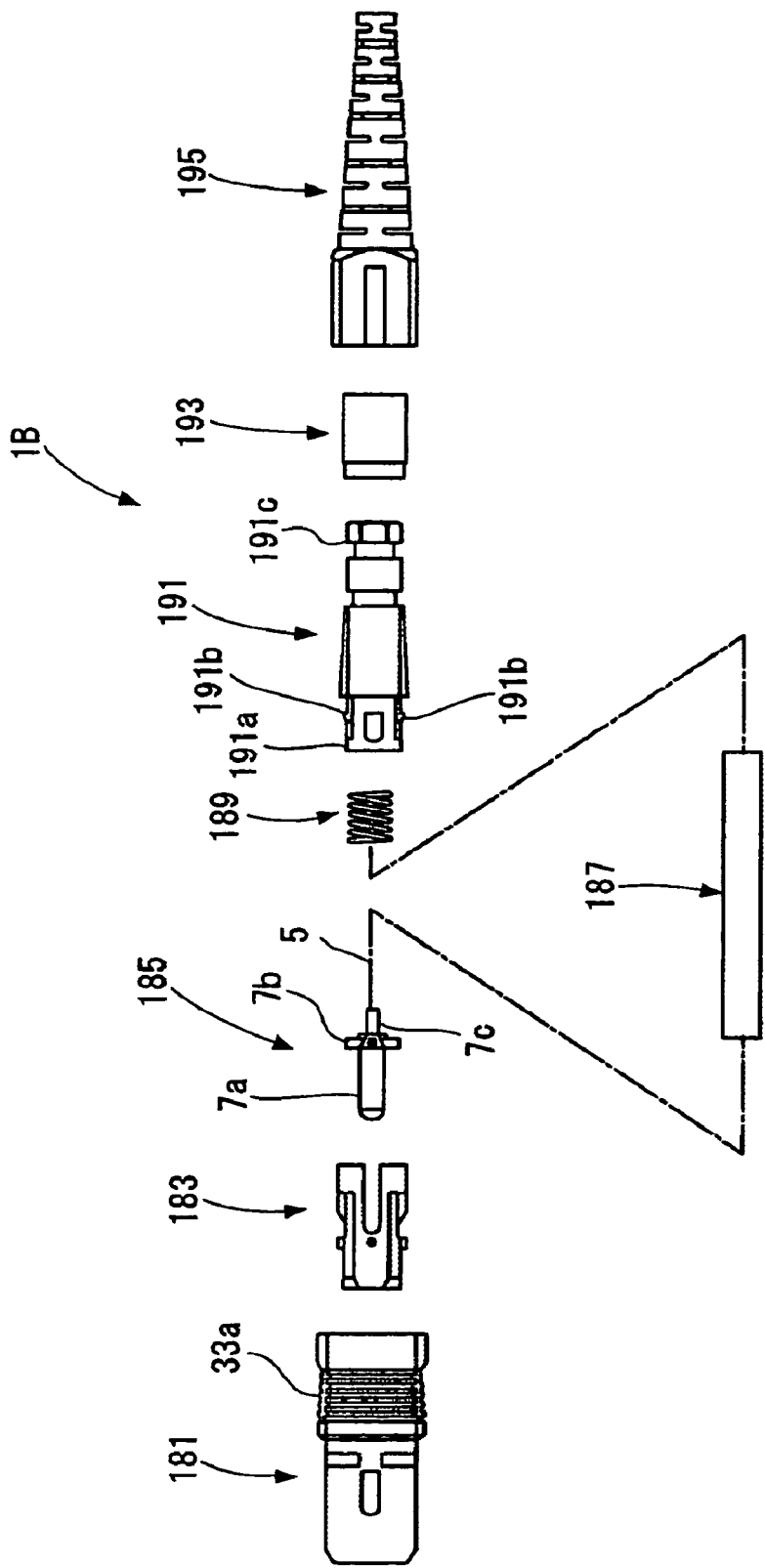
FIG. 17 An exploded side view of an optical connector used in a third embodiment of the present invention.

FIG. 17 is an exploded side view of an optical connector used in the third embodiment of the present invention. In this case, in the present embodiment, explanation will be made by affixing the same symbols to the same member and the same portion in the above embodiment.

The optical connector can be applied to both the fiber cord type to which an optical fiber cord 70 is connected and the coated fiber type to which the coated optical fiber 3 is connected. The coated fiber type optical connector uses substantially common components to the fiber cord type optical connector except that a shape of the Sc connector knob is slightly different. In the following explanation, mainly a fiber cord type optical connector (referred simply to as an "optical connector" hereinafter) 1B will be explained.

The optical connector 1B has an Sc connector knob 181, a plug frame 183, a fiber built-in ferrule (optical connector ferrule) 185, a protection sleeve 187, a ferrule set spring 189, a rear housing 191, a caulking ring 193, and a boots 195 as major members from the top end side (the left side in FIG. 18) to which the counter side optical connector is coupled. That is, the structure in which the stopper 11 and the coupling component 31 explained in the above embodiment are not used is shown.

Figure 18:
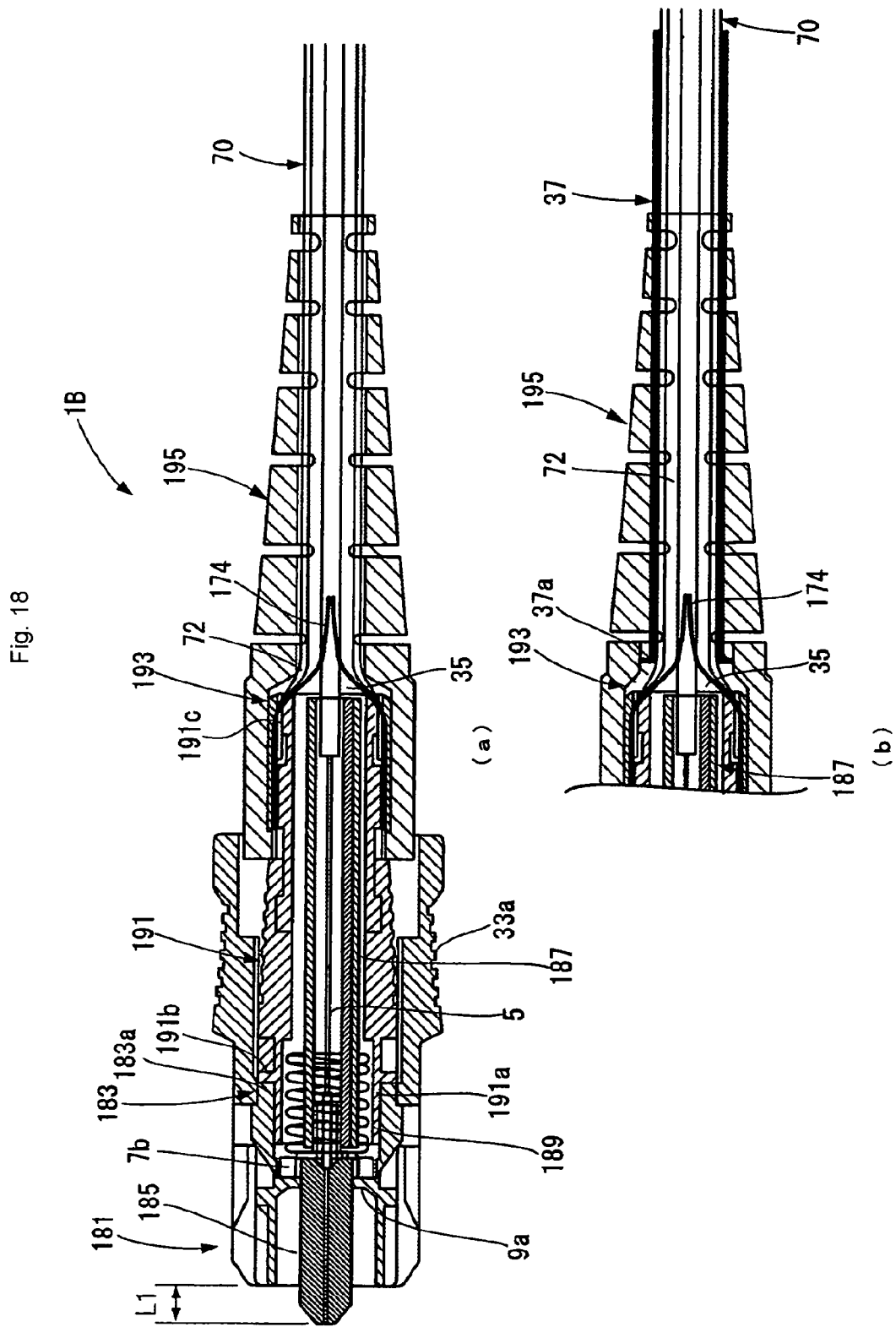
FIG. 18 (*a*) is a longitudinal sectional view of the optical connector shown in FIG. 17, and (*b*) is a longitudinal sectional view of a pertinent portion of a variation in which a reinforcing tube is fitted.

FIG. 18(a) is a longitudinal sectional view of the optical connector shown in FIG. 17, and FIG. 18 (b) is a longitudinal sectional view of a pertinent portion of a variation in which a reinforcing tube is fitted.

The optical connector ferrule 185 is constructed by fitting an diameter-enlarged portion 7b whose outer diameter is enlarged to the back side of a top end shaft portion 7a to which the optical connecter ferrule on the other side is butted and connected, and the short optical fiber 5 is fitted to the optical connector ferrule 185 such that its center axis is aligned with the top end shaft portion 7a. Also, a sleeve coupling projection 7c to which the protection sleeve 187 described later is coupled is provided to an outer periphery of the optical connector ferrule 185 on the base end side from which the short optical fiber 5 is extended.

Figure 19:
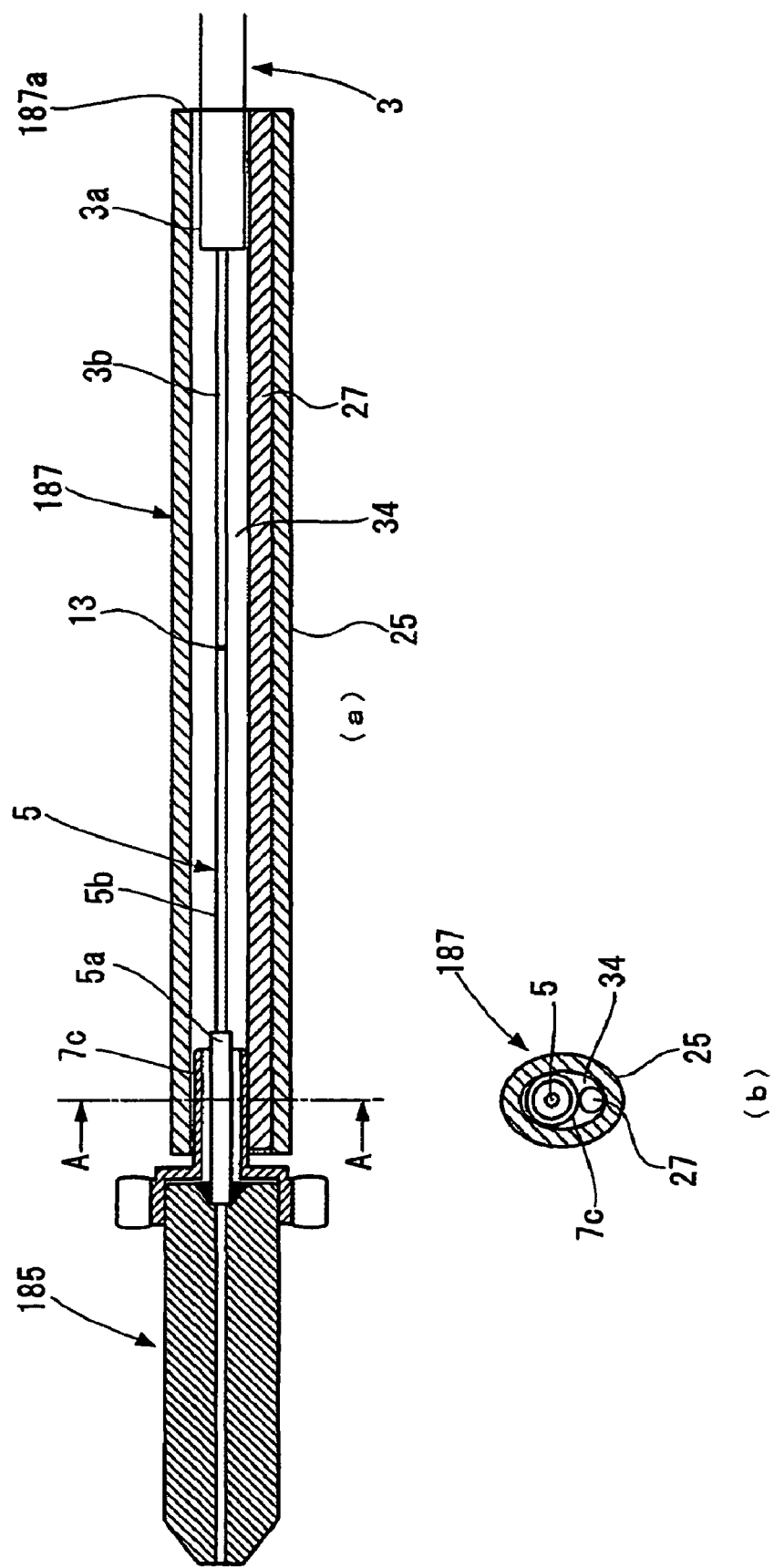
FIG. 19 (*a*) is a sectional view of an optical connector ferrule shown in FIG. 20, and (*b*) is a longitudinal sectional view of a thermal shrinkable tube connected to the optical connector ferrule.

When the optical connector ferrule 185 inserted into an opening of the plug frame 183 on the base end side, the diameter-contracted portion 9a provided to an inner periphery of the plug frame 183 to protrude is brought into contact with the front end of the diameter-enlarged portion 7b, as shown in FIG. 19, and thus a forward movement of this ferrule 185 is restricted. In this state, a position of the optical connector ferrule 185 is fixed in the position that the top end of the optical connector ferrule 185 protrudes from the top end of the plug frame 183 by a predetermined length L1.

In order to prevent adhesion of the dust, etc. to a fiber end surface during the storage, the dust cap 22 (see FIG. 2) is put on a top end of the optical connector ferrule 185 that has been positioned in the plug frame 183.

In this case, the top end surface of the optical connector ferrule 185 is mirror-polished previously to omit the polishing on the job site.

The ferrule set spring 189 is inserted in the plug frame 183 into which the optical connector ferrule 185 is inserted. This ferrule set spring 189 is a compression coil spring that is put and held between the rear housing 191, which is engaged with the plug frame 183 and described later, and the diameter-enlarged portion 7b of the optical connector ferrule 185. The ferrule set spring 189 brings the diameter-enlarged portion 7b of the optical connector ferrule 185 into contact with the above diameter-contracted portion 9a of the plug frame 183, and also elastically support the diameter-enlarged portion 7b retractably.

Figure 20:
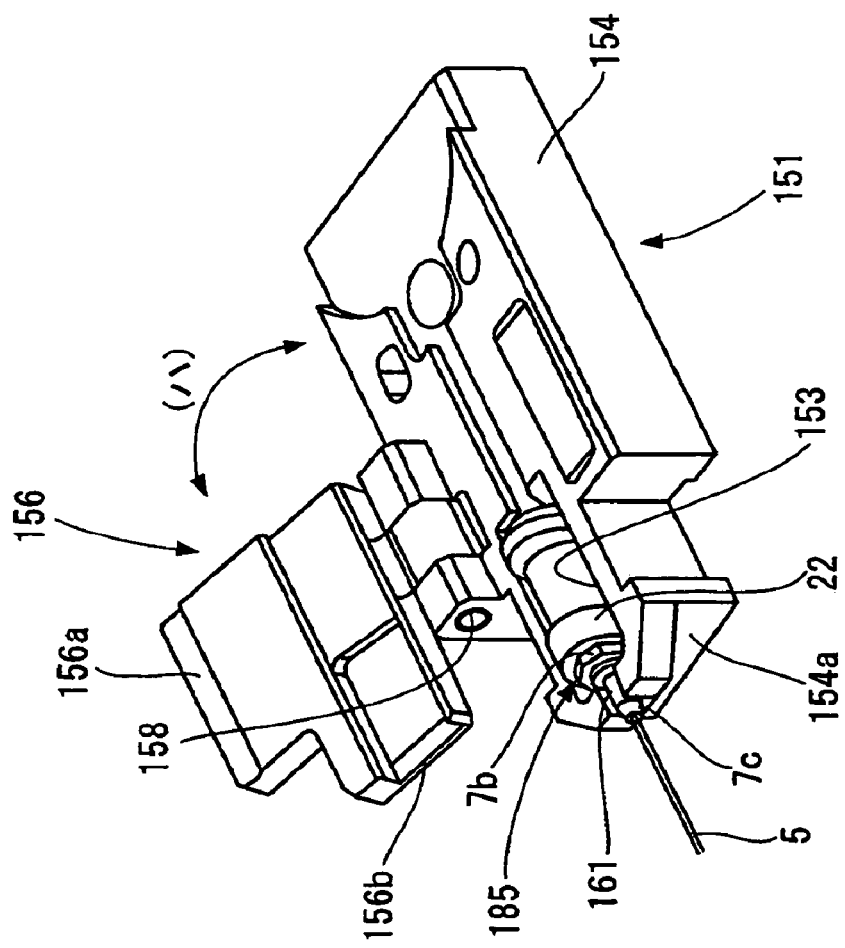
FIG. 20 A perspective view of a third embodiment of the holder according to the present invention.

FIG. 19 (a) is a sectional view of an optical connector ferrule shown in FIG. 20, and FIG. 19(b) is a longitudinal sectional view of a thermal shrinkable tube connected to the optical connector ferrule.

The fusion spliced portion 13 is formed by butting an end portion 5b, from which a coating 5a is striped off, of the short optical fiber 5 and an end portion 3b, from which a coating 3a is striped off, of the coated optical fiber 3 and then fusing the mutual butted fiber end surfaces.

In this case, the end surface of the short optical fiber 5, from which the coating 5a is striped off, is mirror-processed previously by either the cleavage caused when the optical fiber is cut by applying a bending stress to this fiber or the polishing to neglect the mirror processing on the job site.

Also, preferably an edge of the end surface of the short optical fiber 5 should be chamfered by the electrical discharge process prior to the fusion splicing, for the chipping generated from the edge by the polishing can be prevented. Also, preferably the carbon coated fiber should be employed as the short optical fiber 5, for a reduction of strength caused due to a scratch or a moisture absorption generated in carrying the optical fiber in a coating removed state to the job site can be suppressed. Also, preferably the short optical fiber 5 should be formed of the fiber that is strong against the bending having a small MFD.

As shown in FIG. 19, the protection sleeve 187 is equipped with the thermal shrinkable tube 25 and the core rod 27 and the adhesive tube (see FIG. 14) that are inserted into the thermal shrinkable tube 25. The thermal shrinkable tube 25 is coupled to the optical connector ferrule 185. The coated optical fiber 3 is fitted into the optical connector 1B in a state that an outer coating 72 is removed from the end portion of the optical fiber cord 70 by a predetermined length. The protection sleeve 187 covers the outer periphery of the coated optical fiber 3 on the other end side where this fiber is not coupled to the optical connector ferrule 185.

The thermal shrinkable tube 25 thermally shrinks when it is heated at a predetermined temperature by the heating machine, and is tightly adhered to the core rod 27 that is inserted into this tube.

The adhesive tube 29 is softened by the heating applied when the thermal shrinkable tube 25 is cause to thermally shrink, and acts as the adhesive to bury a clearance 34 between the thermal shrinkable tube 25 and the core rod 27.

The thermal shrinkable tube 25, the core rod 27, and the adhesive tube 29 are positioned with respect to one end of the protection sleeve 187 such that the end portion of the core rod 27 is aligned with the end portion of the adhesive tube 29. Then, the protection sleeve 187 is secured to the sleeve coupling projection 7c of the optical connector ferrule 185 under this positioned condition.

When the end portions of the thermal shrinkable tube 25 and the core rod 27 are press-fitted or adhered or deposited to the optical connector ferrule 185, this optical connector ferrule 185 is fixed/integrated with the tube 25 and the core rod 27.

Respective length dimensions of the short optical fiber 5 and the thermal shrinkable tube 25, the core rod 27 and the adhesive tube 29 of the protection sleeve 187 are set such that, when the protection sleeve 187 is coupled to the sleeve coupling projection 7c on the base end of the optical connector ferrule 185, the fusion spliced portion 13 can be just positioned in an almost middle position of the protection sleeve 187 in the length direction.

After the short optical fiber 5 and the coated optical fiber 3 are fusion-spliced, the protection sleeve 187 is moved to cover the fusion spliced portion 13 and to contact the optical connector ferrule 185. Then, the coated optical fiber 3 and the short optical fiber 5 are fixed by applying a heat to the thermal shrinkable tube 25 in a state that they are positioned vertically along the core rod 27.

In this manner, dimensions of respective components are set such that, when the thermal shrinkable tube 25 is cause to thermally shrink, the end portion of the thermal shrinkable tube 25 overlaps with the coating 3a of the coated optical fiber 3 and the sleeve coupling projection 7c by 2 mm or more.

The rear housing 191 is a cylindrical structural body for covering the periphery of the protection sleeve 187, and is formed by the resin injection molding, or the like. A top end of the rear housing 191 is shaped into a cylinder portion 191a that is fitted into the base end of the plug frame 183. An engaging claw 191b for engaging with an engaging hole 183a formed on the outer periphery on the base end of the plug frame 183 when the rear housing 191 is fitted into the base end of the plug frame 183 is provided to this cylinder portion 191a.

The above rear housing 191 is moved on the protection sleeve 187 and put thereon after the thermal shrinkage process of the protection sleeve 187. Then, the rear housing 191 is coupled integrally with the plug frame 183 by engaging the engaging claw 191b on the top end side with the engaging hole 183a of the plug frame 183.

An SC connector knob 181 serving as a knob portion when the connector is coupled is put/fitted to the outer periphery of the plug frame 183 to which the rear housing 191 is fitted. This SC connector knob 181 is an outer fitting member that provides an external appearance of the optical connector 1B on the top end side. A non-slip serrated pattern 33a for easy grasping is formed on the outer side surface of this knob.

The boots 195 protects the optical fiber cord 70 not apply a sharp bending to the optical fiber cord 70 that extends to the rear side of the rear housing 191. When a top end of the boots 195 is fitted to or screwed into the base end of the rear housing 191, the boots 195 is coupled integrally to the rear housing 191.

In this case, the boots 195 may be formed integrally with the rear housing 191 by the resin injection molding.

The space 35 (see FIG. 18) for allowing retreat of the protection sleeve 187 is formed between the other end 187a (see FIG. 19) of the protection sleeve 187 and the inner wall end opposing to this other end 187a in the boots 195.

In this case, as shown in FIG. 18(b), the boots 195 may have such a structure that the reinforcing tube 37 that is put on the optical fiber cord 70 is inserted/fitted to the rear side of the inner wall end.

A slip-off preventing portion 37a whose diameter is expanded toward the top end is provided to the reinforcing tube 37. When the slip-off preventing portion 37a is latched on the inner wall end of the boots 195, its backward movement is restricted. The reinforcing tube 37 is a tube having an adequate elasticity to prevent that the optical fiber cord 70 is bent sharply.

In the optical connector 1B, the outer coating 72 is stripped off largely from the end portion of the optical fiber cord 70 to provide the good fusion splicing operation when the short optical fiber 5 of the optical connector ferrule 185 is fusion-spliced to the coated optical fiber 3 being exposed by removing the outer coating 72 of the optical fiber cord 70 on the job site. The coated optical fiber 3 whose outer periphery is covered with a high tensile fiber (Kevlar) 174 is exposed from the optical fiber cord 70 when the outer coating 72 is stripped off (removed) from the end portion.

The high tensile fiber 174 and the outer coating 72 are cut in a predetermined length, and inserted on a rear end portion 191c of the rear housing 191. The caulking ring 193 is put on the outer periphery of the outer coating 72, and the caulking ring 193 is caulked to reduce the diameter. Since the diameter of the caulking ring 193 is reduced, the outer coating 72 and the high tensile fiber 174 are press-fitted into the caulking ring 193 and the rear end portion 191c and secured to the rear housing 191.

Next, the holder according to the present embodiment will be explained hereunder.

Figure 21:
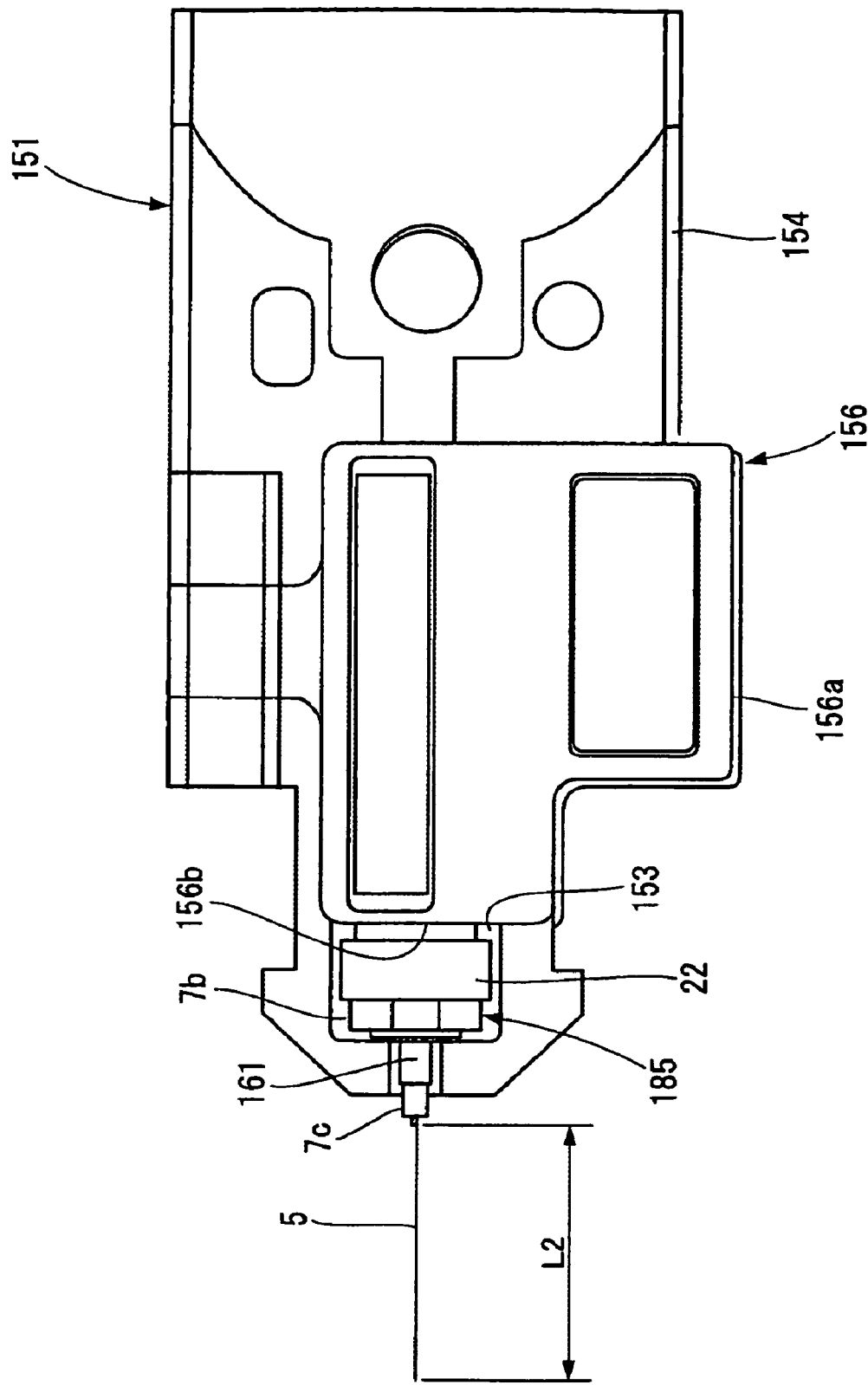
FIG. 21 A plan view showing a state that a lid member of the holder shown in FIG. 20 is closed.
Figure 22:
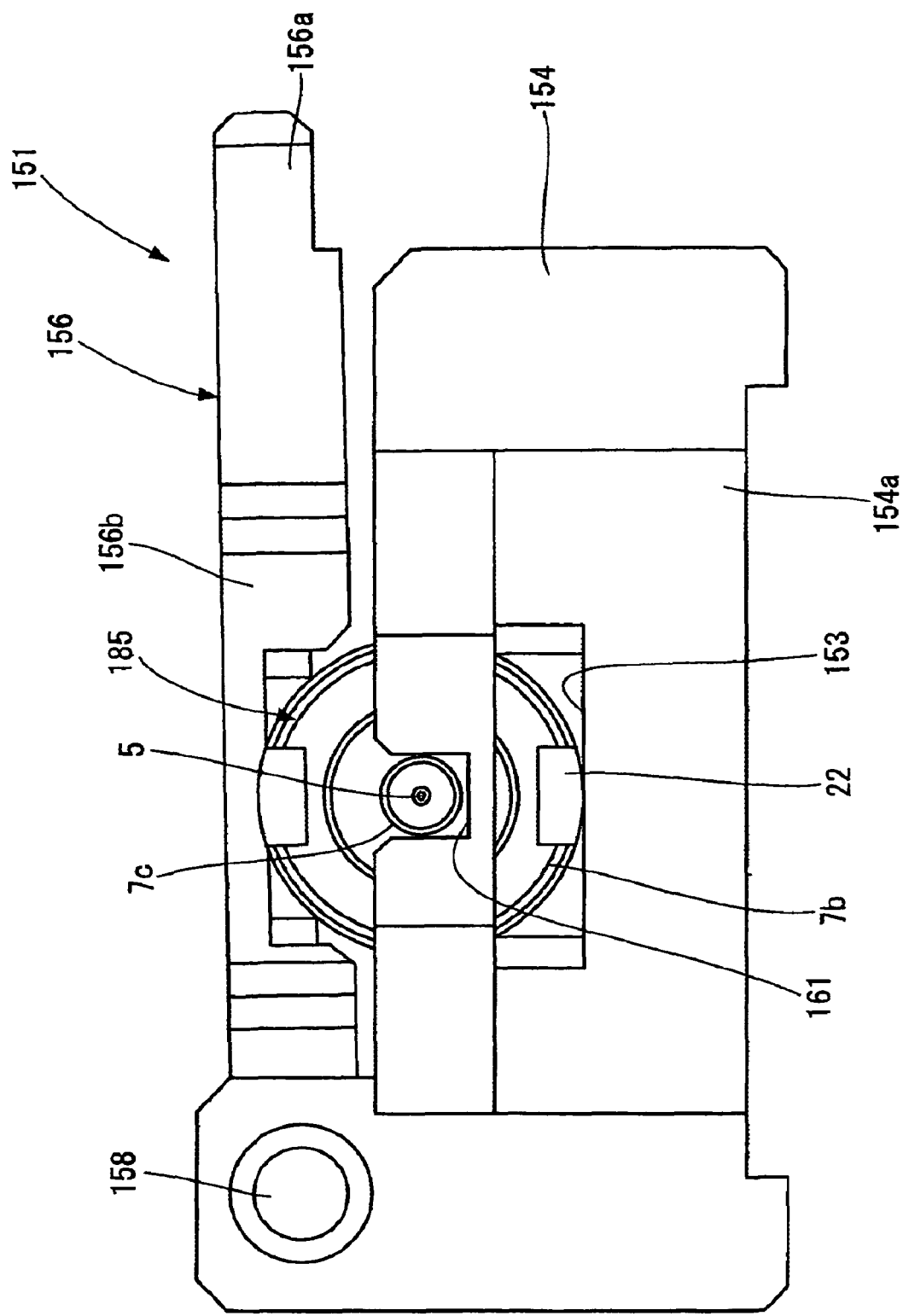
FIG. 22 A front view of the holder shown in FIG. 21.

FIG. 20 is a perspective view of a third embodiment of the holder according to the present invention, FIG. 21 is a plan view showing a state that a lid member of the holder shown in FIG. 20 is closed, and FIG. 22 is a front view of the holder shown in FIG. 21.

A holder 151 of the third embodiment holds the optical connector ferrule 185 (see FIG. 17) in a state that the dust cap 22 is put, and protects the optical connector ferrule 185.

In the holder 151 of the present embodiment, a foldable lid member 156 is provided to a holder main body 154 in which a ferrule containing portion 153 as the recess for containing the optical connector ferrule 185 is formed to open upward. This lid member 156 covers the ferrule containing portion 153, and presses the optical connector ferrule 185 contained in the ferrule containing portion 153.

The box-like cap 57 (see FIG. 2) is detachably coupled to the front end side of the holder main body 154 from which the short optical fiber 5 extends. The box-like cap 57 covers the periphery of the short optical fiber 5 extended from the holder main body 154 to protect the short optical fiber 5.

The cap 57 should be formed of the antistatic material.

The lid member 156 is hinged to the side portion of the holder main body 154 around a turning/supporting shaft 158 being fitted to the side portion of the holder main body 154. The lid member 156 is opened/closed in the arrow c direction shown in FIG. 20 based on the turning operation around the turning/supporting shaft 158.

The lid member 156 is shaped into an almost flat plate that is put on the holder main body 154. As shown in FIG. 20, a grasping portion 156a that the worker grasps by fingers in opening/closing operations is projected from its one side portion.

Also, as shown in FIG. 21, a front end portion 156b of the lid member 156 is formed such that the operator can view the base end portion and its neighborhood of the optical connector ferrule 185 contained in the holder main body 154.

As shown in FIG. 22, in the holder 151 of the present embodiment, a recess portion 161 is provided to an upper end surface of a front end wall 154a of the holder main body 154. This recess portion 161 is used to position/support the sleeve coupling projection 7c of the optical connector ferrule 185. The short optical fiber 5 protrudes coaxially from the sleeve coupling projection 7c, as described above.

Also, as shown in FIG. 22, the lid member 156, when closed, presses/holds the optical connector ferrule 185 via the dust cap 22 and thus positions the sleeve coupling projection 7c in the recess portion 161. In this case, it is of course that the lid member 156 may be formed to directly press/hold the optical connector ferrule 185. Also, a length of the ferrule containing portion 153 in the axial direction is almost equal to a length from a front end of the diameter-enlarged portion 7b of the optical connector ferrule 185 to a rear end of the dust cap 22. Accordingly, the optical connector ferrule 185 on which the dust cap 22 is put is housed without the play in the axial direction. In this holder 151, when the front end of the diameter-enlarged portion 7b is brought into contact with the front inner wall of the ferrule containing portion 153, a projection length L2 (see FIG. 21) of the short optical fiber 5 is set to about 10 mm. That is, a relative position of the short optical fiber 5 to the holder 151 is decided.

When the holder 151 is fitted to a fusion splicing apparatus 171 that fusion-splices other coated optical fiber 3 (see FIG. 23) on the job site, described later, the short optical fiber 5 protruded from the optical connector ferrule 185 that is contained in the ferrule containing portion 153 is positioned in the fusion splicing position as it is.

According to the holder 151 of the third embodiment explained as above, when the optical connector ferrule 185 to which the short optical fiber 5 is fitted in advance is contained in the holder 151 and the cap 57 is put thereon, the holder 151 protects the optical connector ferrule 185 and the short optical fiber 5 from the impact, etc. applied from the outside.

In addition, the holder 151 can position the short optical fiber 5 while containing the optical connector ferrule 185 as it is in the fusion splicing position of the fusion splicing apparatus 171. Therefore, the holder 151 can improve the handling property in the fusion splicing operation.

Also, only when the holder 151 is fitted to the fusion splicing apparatus 171, there is no need to prepare the dedicated fusion splicing apparatus for connecting the existing coated optical fibers mutually.

Also, the recess portion 161 for positioning/supporting the extended short optical fiber 5 is provided to the holder 151 of the present embodiment. The short optical fiber 5 protruded from the optical connector ferrule 185 that is contained in the holder 151 is positioned precisely on the holder 151. Therefore, when the holder 151 is set in the fusion splicing apparatus 171, a time and labor required for positioning the short optical fiber 5 is not needed.

Also, the holder 151 of the present embodiment is constructed such that the lid member 156 for pressing the optical connector ferrule 185 being contained in the ferrule containing portion 153 is provided to the holder main body 154 in which the ferrule containing portion 153 that contains the optical connector ferrule 185 therein is formed to open upwardly. Therefore, the optical connector ferrule 185 can be easily put in or taken out from the holder 151 by opening/closing the foldable lid member 156.

Also, the short optical fiber 5 extended from the optical connector ferrule 185 that is housed in the holder main body 154 is positioned by the recess portion 161, and then the optical connector ferrule 185 is fixed by the lid member 156. Therefore, the positioning of the short optical fiber 5 can be executed without fail.

Also, the front end portion 156b through which the base end portion and its neighborhood of the optical connector ferrule 185 can be viewed is formed in the lid member 156. Therefore, the operator can check the contained state, the type, etc. of the contained optical connector ferrule 185 not to open the lid member 156.

In this embodiment, in order to make it easy to view the optical connector ferrule 185 contained in the holder main body 154, the front end portion 156b is provided to the lid member 156. Alternately, the lid member 156 may be formed of the transparent material in place of the formation of the front end portion 156b. Even when the lid member 156 is formed of the transparent material in this manner, the operator can check the contained optical connector ferrule 185 with the eyes not to open the lid member 156.

Next, an embodiment of the fusion splicing apparatus using the holder 151 will be explained hereunder.

Figure 23:
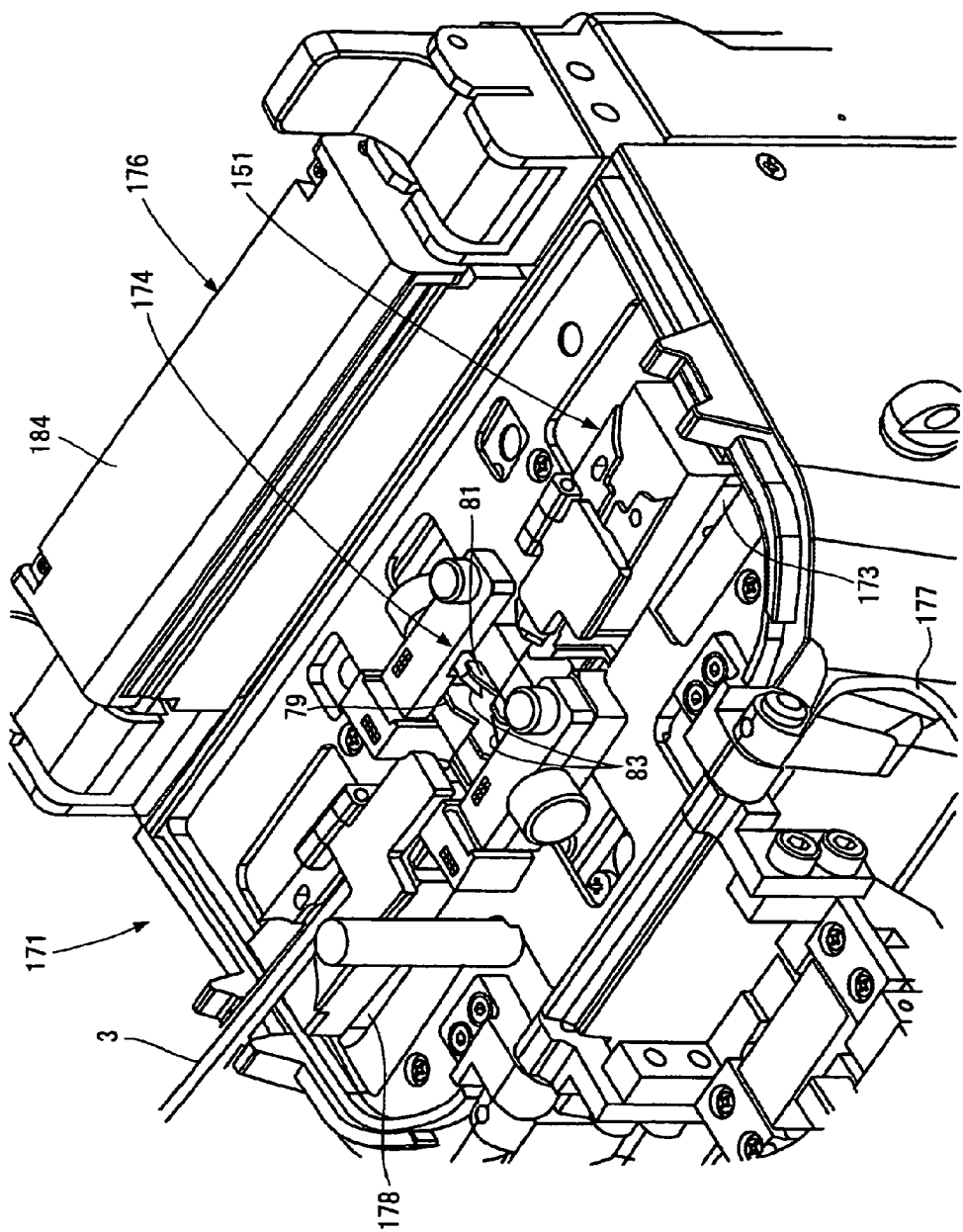
FIG. 23 A perspective view of a fusion splicing apparatus according to the present embodiment when viewed from the obliquely above side.
Figure 24:
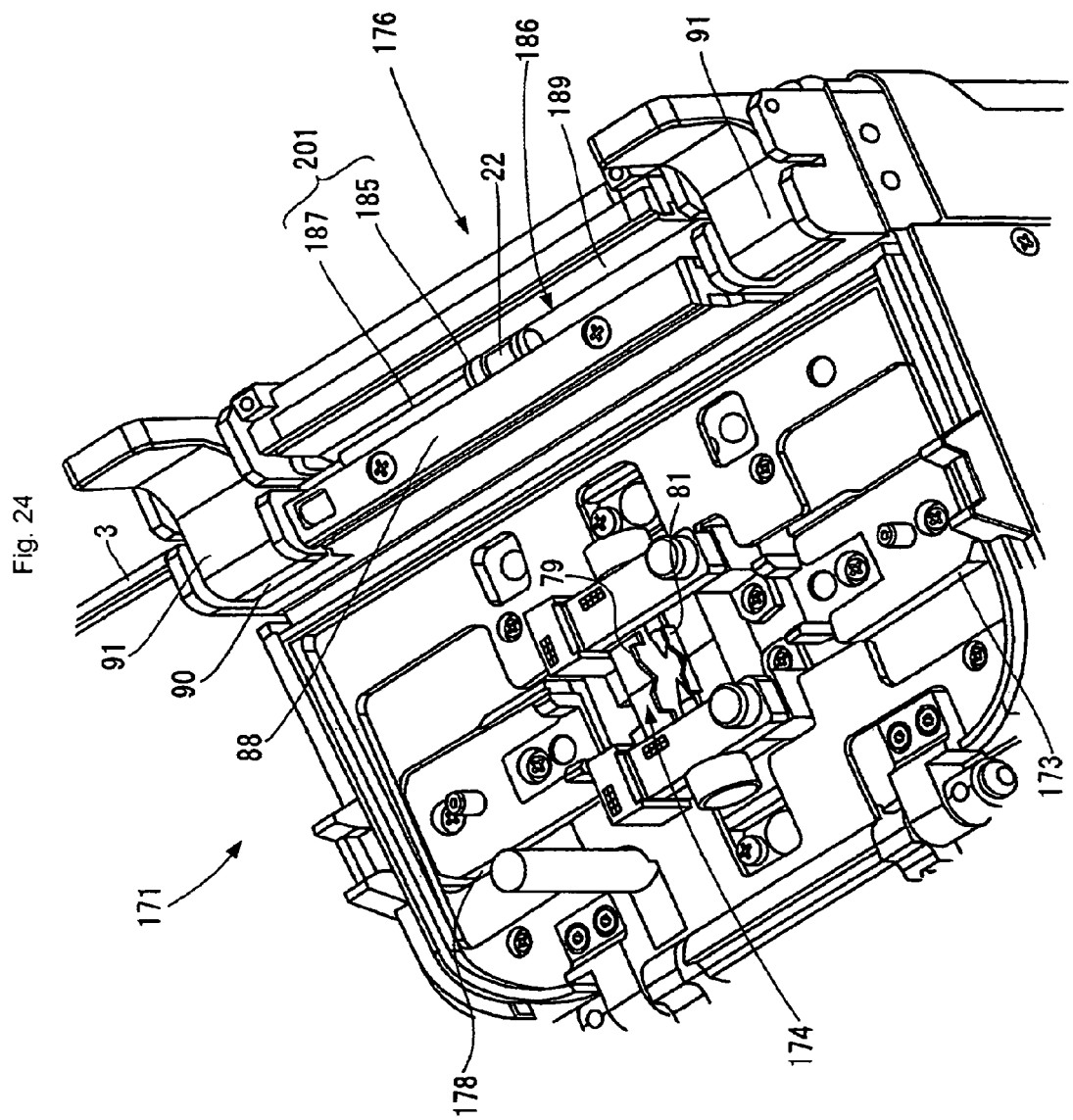
FIG. 24 An enlarged view of the fusion splicing apparatus in FIG. 23 in a state that a cover of a thermal shrinkage processing portion is removed.
Figure 25:
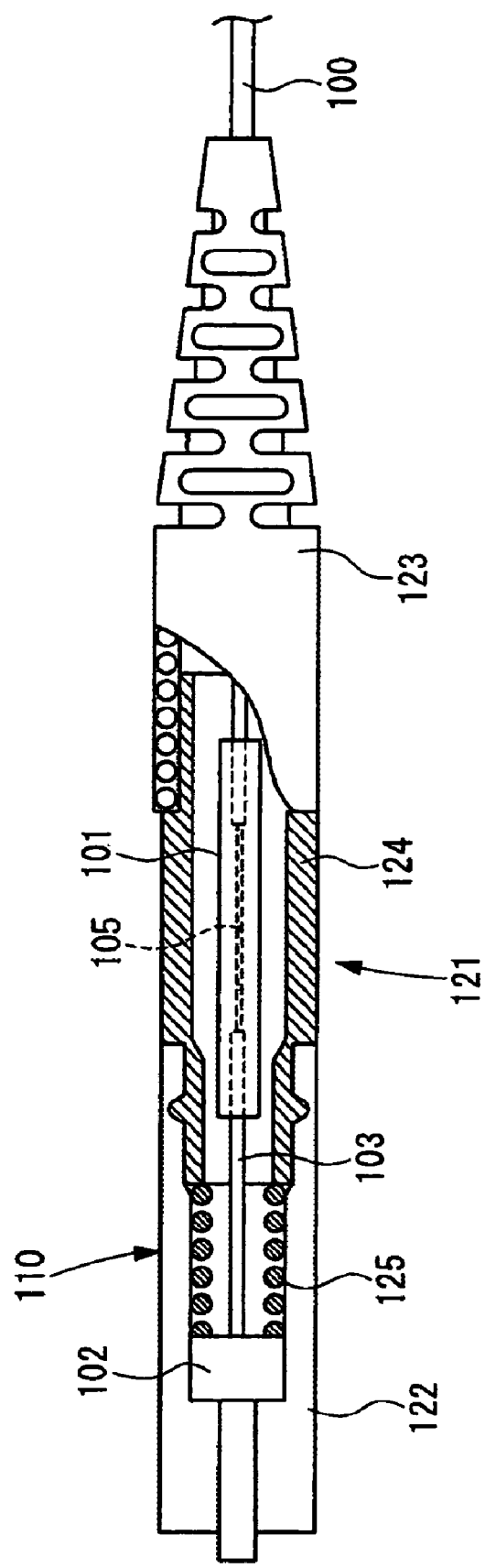
FIG. 25 An explanatory view of a fusion splicing structure in the prior art.

FIG. 23 is a perspective view of a fusion splicing apparatus according to the present embodiment when viewed from the obliquely above side, and FIG. 24 is an enlarged view of the fusion splicing apparatus in FIG. 23 in a state that a cover of a thermal shrinkage processing portion is removed.

The fusion splicing apparatus 171 is the apparatus that fusion-splices the short optical fiber 5 fitted previously to the optical connector ferrule 185 to other coated optical fiber 3 on the job site where the optical fiber provision work is carried out.

This fusion splicing apparatus 171 is equipped with a fusion processing portion 174 and a thermal shrinkage processing portion 176. This fusion processing portion 174 is equipped with a holder fitting portion 173 that positions the short optical fiber 5 in a fusion splicing position to other coated optical fiber 3 by fitting the short optical fiber 5 contained in the above holder 151 together with the holder. This thermal shrinkage processing portion 176 causes the thermal shrinkable tube 25, which is put on the outer periphery of the fusion spliced portion 13 (see FIG. 19) between the short optical fiber 5 and other coated optical fiber 3 both being fusion-spliced by the fusion processing portion 174, to shrink by the heater.

Normally the fusion processing portion 174 is provided to the upper surface portion of the apparatus that is covered with a foldable cover 177.

As shown in FIG. 24, the fusion processing portion 174 includes a fiber fitting portion 178 to which other coated optical fiber 3 is set on the job site, the V-groove member 79 arranged at the top end of the fiber fitting portion 178 to position a top end position of the coated optical fiber 3 being set in the fiber fitting portion 178, the V-groove member 81 for positioning a top end position of the short optical fiber 5 extended from the holder 151 being set in the holder fitting portion 173, and the electrode 83 arranged between a pair of V-groove members 79, 81 to fusion-splice the mutually butted fibers by the discharge.

Respective dimensions of the V-groove member 81 for positioning the short optical fiber 5 and the recess portion 161 of the holder 151 being set in the holder fitting portion 173 are set such that they support/position the short optical fiber 5 on a straight line.

The holder fitting portion 173 may be equipped previously with the holder. In this case, the optical connector ferrule 185 housed in another case is picked up and then is housed in the holder 151 being set in the holder fitting portion 173.

The thermal shrinkage processing portion 176 has a dedicated opening/closing cover 184, and is equipped adjacent to the fusion processing portion 174.

As shown in FIG. 24, a thermal shrinkage processing portion 186 is provided when the opening/closing cover 184 is opened.

The thermal shrinkage processing portion 186 is equipped with a heating portion 88 in which a heater (not shown) for heating the thermal shrinkable tube 25 is provided, a ferrule fitting portion 189 for positioning the optical connector ferrule 185 taken out from the holder 151 and fitting it, and a fiber fitting portion 90.

A foldable cover 91 for pressing a jumping-out of the coated optical fiber is fitted to the ferrule fitting portion 189 and the fiber fitting portion 90.

A heating temperature distribution of the heater is set in the thermal shrinkage processing portion 186 such that a heating temperature on the short optical fiber 5 side of the thermal shrinkable tube 25 is set higher than that on the coated optical fiber 3 side.

The thermal shrinkage processing portion 186 has the configuration that is suitable for the protection sleeve 187 in which the end portion of the thermal shrinkable tube 25 is connected to the sleeve coupling projection 7c of the optical connector ferrule 185. Since the heating temperature distribution is provided to the heater such that first the short optical fiber 5 side is heated at a high temperature to shrink and then the coated optical fiber 3 side is caused to shrink, a vapor generated due to the shrinkage and remaining in the thermal shrinkable tube 25 is ready to escape from the end portion of the coated optical fiber 3 side.

The fusion splicing apparatus 171 explained above is equipped with the fusion processing portion 174 to which the holder fitting portion 173 to which the holder 151 containing the optical connector ferrule 185 is fitted is provided. Therefore, the short optical fiber 5 fitted to the optical connector ferrule 185 and other coated optical fiber 3 can be fusion-spliced mutually not to pick up the optical connector ferrule 185 from the holder 151, and operability in the fusion splicing operation can be improved.

In respective embodiments of the holder, the lid member is provided to the holder main body. But the foldable cover of the fusion splicing apparatus may be used commonly as this lid member.

Next, an assembling method of the optical connector 1B shown in FIG. 17 by using the holder 151 and the fusion splicing apparatus 171 will be explained-hereunder.

In this assembling method, the holder 151 containing the optical connector 1B and shown in FIG. 21 is prepared previously. Also, the coated optical fiber 3 on the job site are inserted into the protection sleeve 187, the rear housing 191, and the boots 195.

Then, as shown in FIG. 23, the step of setting the coated optical fiber 3 in the fiber fitting portion 178 of the fusion processing portion 174 of the fusion splicing apparatus 171 and the step of setting the holder 151 in which the optical connector ferrule 185 is housed to the holder fitting portion 173 of the fusion processing portion 174 are carried out.

Then, the short optical fiber 5 positioned in the holder 151 fitted to the holder fitting portion 173 and the coated optical fiber 3 positioned in the fiber fitting portion 178 are fusion-spliced in the fusion processing portion 174.

Then, the fusion spliced portion 13 is formed by fusion-splicing the short optical fiber 5 and the coated optical fiber 3, and then the optical connector ferrule 185 is taken out from the holder 151. Then, as shown in FIG. 24, the steps of obtaining a ferrule/sleeve coupled body 201 by moving the protection sleeve 187 having the thermal shrinkable tube 25 onto the fusion spliced portion 13 and then inserting the sleeve coupling projection 7c of the optical connector ferrule 185 into one end of the protection sleeve 187 are carried out.

Also, the ferrule/sleeve coupled body 201 is transferred to the thermal shrinkage processing portion 186 to cause the thermal shrinkable tube 25 of the protection sleeve 187 to thermally shrink. Thus, as shown in FIG. 19, the steps of obtaining the structure in which the fusion spliced portion 13 is reinforced by the thermal shrinkable tube 25 are carried out.

Then, a completed structure shown in FIG. 18 is obtained by coupling the plug frame 183 and the rear housing 191 and the boots 195, through which the coated optical fiber 3 is passed previously, to the optical connector ferrule 185 built up as the structure.

According to the above optical connector assembling method, the optical connector 1B can be assembled effectively by using the holder 151 and the fusion splicing apparatus 171 without any damage of the optical connector ferrule 185 and the short optical fiber 5.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2006-307142) filed Nov. 13, 2006; the contents of which are incorporated herein by reference.

INDUSTRIAL APPLICABILITY

The holder can protect the optical connector ferrule and the short optical fiber from the impact, etc. from the external cause if the connector plug having the optical connector ferrule is housed therein.

In addition, this holder can position the short optical fiber fitted to the optical connector ferrule in the fusion position of the fusion splicing apparatus. Therefore, the troublesome operation for picking up the connector plug from the holder in the fusion splicing operation can be omitted, and the handling property in the fusion splicing operation can be improved.

Also, the short optical fiber fitted to the optical connector ferrule and other coated optical fiber can be fusion-spliced not to take out the connector plug from the holder. Thus, the operability of the fusion splicing operation can be improved.

Also, when the thermal shrinkage processing portion for causing the thermal shrinkable tube to thermally shrink is provided in parallel with the fusion processing portion, thermal shrinkage process of the thermal shrinkable tube can be executed not to take out the connector plug from the holder.

Further, the optical connector assembling method can assemble the optical connector effectively by using the above holder and the above fusion splicing apparatus without any damage of the optical connector ferrule and the short optical fiber.

The invention claimed is:

1. A holder for containing an optical connector ferrule to which a short optical fiber is fitted, the holder comprising: a housing portion configured to hold the optical connector ferrule; and a lid member rotatably connected to the housing portion, wherein: the lid member is configured to press the optical connector ferrule to position the short optical fiber when the lid member is closed via a covering member which is in contact with and covers the optical connector ferrule, and the holder is configured so as to be fitted to a fusion splicing apparatus that fusion-splices the short optical fiber and other coated optical fiber.

2. The holder according to claim 1, wherein the housing has a recess portion for positioning the short optical fiber extending from the optical connector ferrule.

3. The holder according to claim 1, wherein the lid member is formed of transparent material.

4. The holder according to claim 1, wherein the optical connector ferrule to which the short optical fiber is fitted is contained in a connector plug whose outer periphery is covered with a plug frame.

5. The holder according to claim 2, wherein the recess is a V groove.

6. The holder according to claim 2, wherein the lid member is configured to press the short optical fiber positioned on the recess when the lid member is closed.

7. A fusion splicing apparatus for fusion-slicing a short optical fiber fitted to an optical connector ferrule and other coated optical fiber, comprising:
   a fusion processing portion equipped with a holder fitting portion that fits the holder set forth in claim 1.

8. A fusion splicing apparatus according to claim 7, further comprising:
   a thermal shrinkage processing portion for heating/shrinking a thermal shrinkable tube that is put on an outer periphery of a fusion spliced portion being formed by the fusion processing portion;
   wherein the thermal shrinkage processing portion is equipped with a holder fitting portion that fits the holder.

9. A fusion splicing apparatus according to claim 8, wherein the thermal shrinkage processing portion has a first thermal shrinkage processing portion in which a heating temperature distribution is set such that a heating temperature of the thermal shrinkable tube on the short optical fiber side is higher than that on the coated optical fiber side.

10. A fusion splicing apparatus according to claim 9, wherein the thermal shrinkage processing portion has a second thermal shrinkage processing portion in which a heating temperature distribution is set such that a heating temperature of the thermal shrinkable tube on a middle portion side is higher than that on an end portion.

11. An optical connector assembling method of assembling an optical connector in which other coated optical fiber is fusion-spliced to a short optical fiber, by fusion-splicing the short optical fiber being fitted to an optical connector ferrule to the other coated optical fiber while using the fusion splicing apparatus set forth in claim 7, comprising;
   a step of setting the coated optical fiber on a fiber fitting portion of a fusion processing portion of the fusion splicing apparatus;
   a step of setting a holder that holds the optical connector ferrule therein in a holder fitting portion of the fusion processing portion;
   a step of fusion-splicing the short optical fiber positioned in the holder that is fitted to the holder fitting portion and the coated optical fiber positioned in the fiber fitting portion in the fusion processing portion;
   a step of forming a fusion spliced portion by fusion-splicing the short optical fiber and the coated optical fiber, and then putting a protection sleeve having a thermal shrinkable tube on the fusion spliced portion; and
   a step of transferring the fusion spliced portion to a thermal shrinkage processing portion, and then heating the thermal shrinkable tube of the protection sleeve to shrink.

12. A holder for an optical connector ferrule to which a short optical fiber is fitted, the holder comprising: a housing portion holding the optical connector ferrule to which the short optical fiber is fitted; and a lid member rotatably connected to the housing portion, wherein: the lid member is configured to press the optical connector ferrule to position the short optical fiber when the lid member is closed via a covering member which is in contact with and covers the optical connector ferrule, and the holder is configured so as to be fitted to a fusion splicing apparatus that fusion-splices the short optical fiber and other coated optical fiber.

* * * * *

UNITED STATES PATENT AND TRADEMARK OFFICE
CERTIFICATE OF CORRECTION

PATENT NO. : 7,934,874 B2
APPLICATION NO. : 11/984089
DATED : May 3, 2011
INVENTOR(S) : Toshihiko Honma et al.

Page 1 of 1

It is certified that error appears in the above-identified patent and that said Letters Patent is hereby corrected as shown below:

ON THE TITLE PAGE:

Below Item "(65) Prior Publication Data", and before Item "(30) Foreign Application Priority Data", insert Item (63):

--Related U.S. Application Data

(63) Provisional Application No. 60,877,352, filed December 28, 2006.--

Signed and Sealed this
Twenty-fifth Day of October, 2011

David J. Kappos
*Director of the United States Patent and Trademark Office*